United States Patent [19]
Gerardi et al.

[11] Patent Number: 5,191,791
[45] Date of Patent: Mar. 9, 1993

[54] PIEZOELECTRIC SENSOR

[76] Inventors: Joseph J. Gerardi, 81 Crystal Dr., Dryden, N.Y. 13053; Philip R. Dahl, 16919 Strawberry Dr., Encino, Calif. 91436; Gail A. Hickman, 81 Crystal Dr., Dryden, N.Y. 13053

[21] Appl. No.: 518,043

[22] Filed: May 4, 1990

Related U.S. Application Data

[63] Continuation-in-part of Ser. No. 295,722, Jan. 10, 1989.

[51] Int. Cl.$^5$ ............................................. G01C 21/00
[52] U.S. Cl. ................................................... 73/178 R
[58] Field of Search ............. 73/178 R, 178 H, 178 T, 73/170 R, 147; 364/424.06

[56] References Cited

U.S. PATENT DOCUMENTS

| | | | |
|---|---|---|---|
| 2,541,512 | 2/1951 | Hahn | 73/170 R |
| 2,789,281 | 4/1957 | Short et al. | 340/582 |
| 2,800,647 | 7/1957 | Baerwald et al. | 340/582 |
| 3,240,054 | 3/1966 | Roth | 73/576 |
| 3,362,663 | 1/1968 | Wehrmann | 244/130 |
| 3,383,914 | 5/1968 | MacArthur | 73/147 |
| 4,372,157 | 2/1983 | Caruthers et al. | 73/147 |
| 4,435,695 | 3/1984 | Maris | 73/178 R |
| 4,461,178 | 7/1984 | Chamuel | 73/599 |
| 4,516,747 | 5/1985 | Lurz | 244/204 |
| 4,545,553 | 10/1985 | Finke et al. | 244/134 |
| 4,553,137 | 11/1985 | Marxer et al. | 340/582 |
| 4,568,922 | 2/1986 | Schwippert et al. | 340/582 |
| 4,570,881 | 2/1986 | Lustenberger | 244/134 |
| 4,592,229 | 6/1986 | Butefisch et al. | 73/147 |
| 4,604,612 | 8/1986 | Watkins et al. | 340/582 |
| 4,611,492 | 9/1986 | Koosmann | 73/579 |
| 4,690,353 | 9/1987 | Haslim et al. | 244/134 |
| 4,732,351 | 3/1988 | Bird | 244/134 |
| 4,766,369 | 8/1988 | Weinstein | 324/61 |
| 4,775,118 | 10/1988 | Daniels | 244/134 |
| 4,786,020 | 11/1988 | Franke et al. | 244/204 |
| 4,802,642 | 2/1989 | Mangiarotty | 244/200 |
| 4,891,628 | 1/1990 | Zuckerman | 340/582 |

FOREIGN PATENT DOCUMENTS 0883836  11/1981  U.S.S.R. ............. 73/170 R

OTHER PUBLICATIONS

Olsson et al., "Assessment of the Piezo-Electric Foil as a Mean of Monitoring the Wall Turbulence", *The Aeronautical Research Institute of Sweden (FFA)*, Stockholm, Document No. FFATN 1985-60, 1985, pp. 1-30.

A. Bertelrud, "Use of Hot film Sensors and Piezoelectric Foil for Measurement of Local Skin Friction", *The 12th International Congress on Instrumentation in Aerospace Simulation Facilities (ICIASF)*, Williamsburg, Va., Jun. 22-25, 1987, pp. 1-5 (FIGS. 1-22).

W. B. Scott, "New Stall Detection System Measures Intensity of Turbulent Airflow Over Wing", *Aviation Week & Space Technology*, Jan. 11, 1988, pp. 57-59.

Eric H. Urruti and John F. Wahl "Coatings Affect Fiber Performance in Smart-Skin Sensing", *Laser Focus World*, Jan. 1990, pp. 165-170.

(List continued on next page.)

Primary Examiner—Donald O. Woodiel
Attorney, Agent, or Firm—Pennie & Edmonds

[57] ABSTRACT

The change in capacitance of a sensor is linearly proportional to ice thickness provided that the ice thickness is significantly less than the distance between the conductive electrodes. By employing sensors with different electrodes, the sensitivity to ice may be traded off against the ability to measure greater ice thickness. A sensor with small spacing between electrodes will exhibit a large change in capacitance when covered by a thin layer of ice, however, the capacitance change will be linear only for very thin layers of ice. A sensor with greater spacing between electrodes is less sensitive to ice accretion but has a correspondingly greater ice thickness measurement range. Accordingly, sensor (55) is relatively sensitive and is employed to determine whether or not ice or water is present. This is accomplished by circuit (60) determining whether the measured capacitance is above or below a threshold value. In one particular embodiment, the capacitance of sensor (55) without ice or water present was found to be 400 pF, while the capacitance with ice or water present was found to be 440 pF.

14 Claims, 23 Drawing Sheets

OTHER PUBLICATIONS

W. B. Scott "Air Force Funding Joint Studies to Develop 'Smart Skin' Avionics", *Aviation Week & Space Technology*, Apr. 18, 1988, pp. 65.

Wusk et al. "An Arrayed Hot-Film Sensor for Detection of Laminar Boundary-Layer Flow Disturbance Spatial Characteristics", *AIAA/NASA/AFWAL Sensors & Measurement* Technologies Conference, Atlanta, Ga., Sep. 1-9, 1988, pp. 1-11.

J. S. Heyman and R. S. Rogowski "Fiber Optic Sensor Technology An Opportunity for Smart Aerospace Structures," *AIAA/NASA/AFWAL Conference on Sensors and Measurements Techniques for Aeronautical Applications*, Atlanta, Ga., Sep. 7-9, 1988, pp. 1-5.

Regowski et al. "The Evolution of 'Smart' Composite Material", *NASA Tech. Briefs*, Oct. 1988, pp. 20-22.

Goldberg and Lardiere, Jr., "Developments in Expulsive Separation Ice Protection Blankets", *AIAA, 27th Aerospace Sciences Meeting*, Reno, Nev., Jan. 9-12, 1989, pp. 1-5.

(LONGITUDINAL MODE)

(THICKNESS MODE)

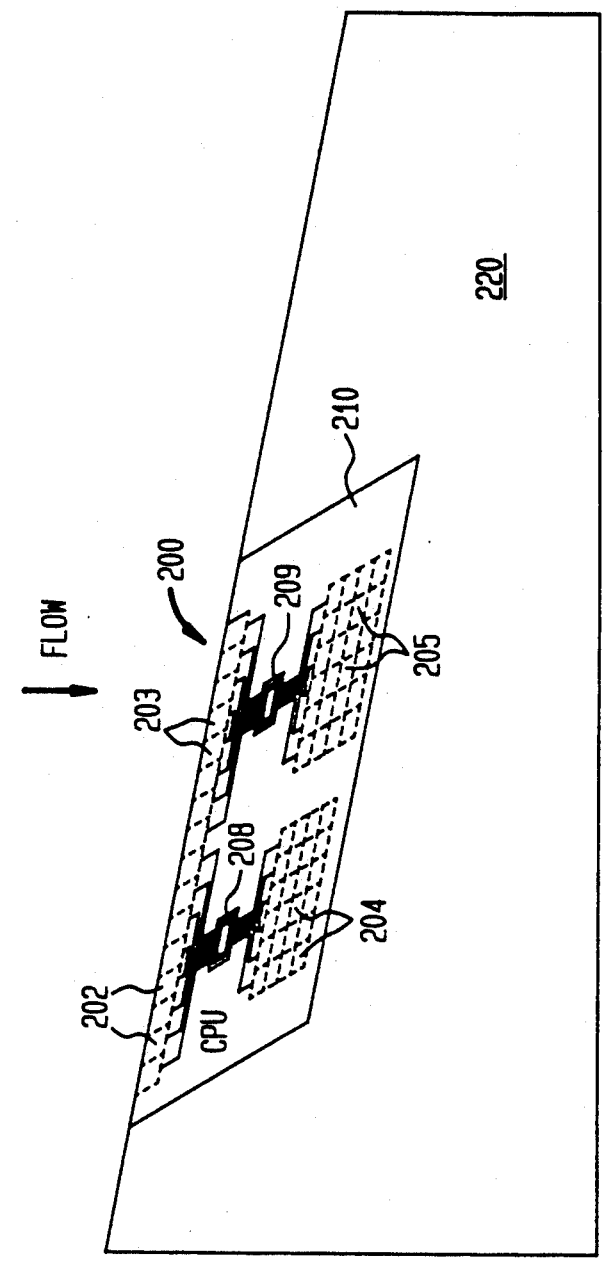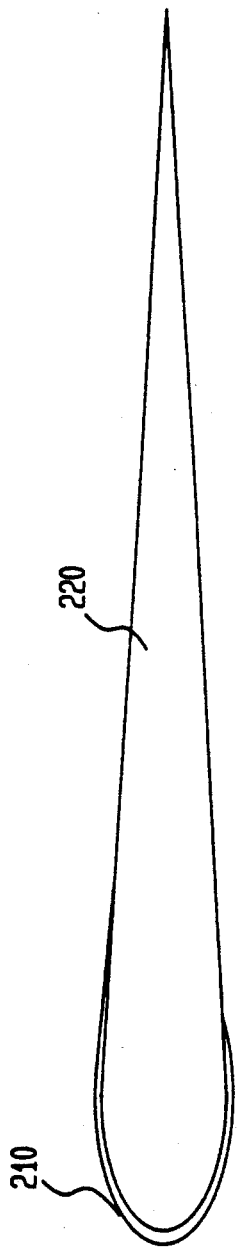
FIG. 12
FIG. 13

PIEZOELECTRIC SENSOR

STATEMENT REGARDING GOVERNMENT FUNDED RESEARCH

This invention was made with Government support under NAS1-18421, NAS2-12890 and NAS3-25618 awarded by the National Aeronautics and Space Administration. The Government has certain rights in this invention.

CROSS-REFERENCE TO RELATED APPLICATIONS

This is a continuation-in-part of U.S. patent application Ser. No. 07/295,722 filed on Jan. 10, 1989, entitled "Smart Skin Ice Detection and De-Icing System", incorporated herein by reference.

BACKGROUND OF THE INVENTION

1. Technical Field

This invention relates generally to monitoring of the aerodynamic performance of aircraft and more particularly to use of thin piezoelectric devices adapted for attachment to exterior surfaces of structures such as aircraft surfaces and in particular aircraft engine inlets, external fuel tanks and airfoils. Such devices are particularly well suited for analyzing activity on the surface which can be used to describe complex boundary layer flow phenomena, vortex flow structures, and warnings of impending stall conditions due to ice accretion or high angle-of-attack. Advantageously, the devices may be employed in the active manipulation of airflow over an airfoil and, more particularly, in the detection and control of boundary layer and vortex flows. Such active control methods may include use of laminar flow control mechanisms (acoustic wave excitation, compliant walls, etc) or active vortex generators. Additionally, the devices may be used to activate deicing systems such as electrothermal heaters to automatically remove ice accretion on aircraft surfaces.

2. Description of the Prior Art

While recently developed flow sensor technologies have made some advances, even the most current systems have shortcomings. They generally require extensive modification of aircraft structure, cannot monitor large areas, cannot provide continuous monitoring, are prone to misinterpretation, cannot be operated in-flight, suffer from inaccuracy, are too complex, bulky and not self-contained, or require extensive power sources. Additionally, known systems are generally very limited in what they measure.

With respect to complex flowfield investigations, measurement techniques which cover the surface as completely as possible (i.e. by employing sensor arrays instead of individual sensors) and monitor a plurality of parameters are clearly desirable. Specific areas which will especially benefit from such a system will be discussed in detail sufficient to enable one to understand the context within which the present invention preferably operates and the problems which must be overcome.

1. Boundary Layer Flow

Detection and monitoring of boundary layer flow phenomena are an important part of developmental aerodynamics. Knowledge of boundary layer flow characteristics enables a designer to optimize airfoil and fuselage designs for maximum performance at desired operating Reynolds numbers. More importantly, development of a rugged and nonintrusive sensor array has applications in advanced control systems which provide feedback signals for active flow control mechanisms. These active systems optimize aerodynamic structural configurations for maximum performance over the entire flight envelope, instead of a fixed best compromise or utility design. In order to fully appreciate the potential benefits of boundary layer flow monitoring, some understanding of aerodynamics as it relates to airfoils is necessary.

Because air is viscous any object such as an airfoil moving through the air collects a group of air particles which are pulled along with the object. A particle directly adjacent to the surface of the object will be pulled along at approximately the speed of the object due to viscous adhesion. As the airfoil moves through a stream of air at a given velocity, this effect causes a very thin layer of air having velocities below that of the stream velocity, to form upon the airfoil surface. This layer, referred to as the "boundary layer", constitutes the interface between the airfoil and its surrounding air mass. Conceptually, the boundary layer may be thought of as the layer of air surrounding an airfoil in which the velocity of the layer of molecules closest to the airfoil is at or near zero with respect to the airfoil, and in which the velocity at points successively distant from the airfoil increases until it approaches that of the airstream, at which point the outer limit of the boundary layer is reached.

Generally, boundary layers may be thought of as being one of two types, laminar or tubulent, although there is a region of transition between laminar and turbulent regions that may in some instances be quite large. A third condition, in which the boundary layer is "unattached", must also be recognized. A laminar boundary layer is typified by smooth flow that is free from eddies. Turbulent flow is characterized by a thicker boundary layer which has a large number of eddies that act to transfer momentum from the faster moving outer portions to the slower moving portions nearer the airfoil surface. Consequently, a turbulent boundary layer has a greater average velocity near the airfoil surface, and a correspondingly greater amount of surface friction, than does a laminar boundary layer. The increase in surface friction causes increased aerodynamic drag that requires greater power to maintain constant airfoil speed.

Typically, a laminar boundary layer will form at or near the leading edge of a conventional airfoil and extend rearward toward points of minimum pressure on the upper and lower surfaces of the airfoil. According to Bernouli's principle, the region between the leading edge and the first minimum pressure point is one of a decreasing pressure gradient. Thereafter, the pressure gradient will increase and the relatively low kinetic energy of the air molecules closest to the airfoil surface may be insufficient to maintain laminar flow against the gradient. In this event it is possible that small pertubations in the boundary layer will develop into eddies that initiate a transition from laminar to turbulent flow. Alternatively, in the presence of higher pressure gradients, the molecules closest to the airfoil surface may actually reverse their direction of motion and begin to move upstream, thereby causing the boundary layer to separate from the airfoil surface. This condition causes significantly more drag, and less lift, than a turbulent boundary layer, and, if reattachment does not occur, the airfoil suffers a decrease in lift referred to as stall.

Mathematical analyses done by W. Tollmien in the early 1930s resulted in the publication of a theory of the stability of laminar motion in the boundary layer near a thin flat plate in an airstream flowing parallel to the plate. The calculations were repeated and extended by H. Schlichting in 1933 and 1935, and were confirmed experimentally in 1941 by Schubauer and Skramstad. The theory predicted that a range of small disturbances or perturbations in the velocity of a laminar airstream would, in mathematically identifiable regions, take on an oscillatory motion, or mode, that would become amplified until laminar flow was broken down. Disturbances occurring outside such identifiable regions would become damped. The regions in which amplification occurred were defined as a function of Blasius velocity distribution and Reynolds number, and experimental data conformed closely to the mathematically predicted phenomena. Schubauer and Skramstad's experimental data also confirmed that the frequency of the amplified oscillations, known as Tollmien-Schlichting, or T-S, waves, fell within a relatively narrow frequency bandwidth. The predicted and experimentally verified T-S frequencies are generally in the range of approximately 100 to 6000 Hz, varying with wing location, flight altitude, and aircraft speed.

Other research has confirmed that Tollmien-Schlichting waves are responsive to external excitation. The application of energy, such as acoustic energy, having frequencies within the range of the characteristic critical wavelengths of T-S waves has been shown to enhance the amplification of T-S waves. It has also been found that external excitation applied to a laminar boundary layer over a frequency band slightly wider than the T-S waves to be controlled causes a delay in the amplification process of T-S waves. This occurs when the wavelengths of the acoustic disturbances are in the same range as the T-S wavelengths and interact with the T-S waves in a time-phase relationship to delay amplification of disturbances in the laminar flow.

Another regime in which T-S waves are affected by external excitation is frequencies substantially higher than the T-S wave critical frequencies, that is, at wavelengths substantially shorter than the T-S critical wavelengths. In this case, disturbances impinging on the laminar flow interfere destructively with the growing T-S waves. Excitation sufficient to destructively interfere with T-S waves should contain frequencies preferably at least twice as high as the highest of the T-S critical frequencies.

Existing devices used to obtain boundary layer flow information include hot wire anemometers, microphones, lasers, and use of paints, dyes, oils and liquid crystals on the surface. While these devices may perform adequately in laboratory environments, limitations prevent them from being used in rugged flight environments.

Piezoelectric materials are also known to be sensitive to boundary layer flow. In fact, the relatively strong piezoelectric effects of polyvinylidene fluoride (PVDF), a piezoelectric polymer film, have only been recently discovered. This film is found to have unusually high performance attributes when stretched and polarized. Piezoelectric material is thin, translucent, tough, pliant, and inexpensive, with high piezoelectric potential and broadband electro-acoustical characteristics. A change in pressure applied to the film will cause an output voltage, but other changes (temperature etc.), may also change an output.

2. Vorticity

Enhanced flight performance, efficiency and maneuverability may be achieved with innovative methods for measuring and controlling vortex-dominated airflow. Future combat aircraft will likely use advanced lift devices to promote strong, sustained and highly organized vortex flow in attaining high levels of maneuverability heretofore impossible. Such lift devices make use of the aerodynamic suction generated along the top surface of a wing while promoting attached airflow over the wing. The forces resulting from such suction and the attendant reduced drag provide both a thrust component and a lift component that enables the aircraft to maneuver at a higher energy level. Formation of these vortices, however, results in highly complex flowfields. Contributing to the complexity are vortex trajectory asymmetries, vortex breakdown, interaction of multiple vortices, and vortex wing/tail interactions. Understanding of the vortex flow phenomena is presently in its infantile stage.

The primary limitation to performance enhancement by separated vortices is vortex breakdown or bursting. When a vortex at a leading edge of the wing bursts, there is a substantial lift reduction and substantial change in aerodynamic moments. Bursting may occur above both sides of the wing, or only above one wing. Unbalanced bursting, as is often the case in roll maneuvers, is a common cause of control problems.

Prerequisite to the optimization and control of advanced lift devices needed to promote sustained, and highly organized vortex flow is the development of advanced sensor systems to replace current methods which include dye-on-surface, smoke-release, and "yarn tuft" visualization. Successful development of sensing devices to detect and monitor vortex flow and the use of active vortex generators (AVGs) could produce advanced control mechanisms that significantly extend fighter aircraft performance without the complexity and weight penalties of pneumatic control systems.

3. Ice Accretion

Ice accretion, or buildup, on aircraft structural members such as airfoils can have deleterious effects on flight performance. Lift decreases, thrust falls off, drag and weight increase, and stall speed dramatically increases. Undetected ice on airfoils has caused a number of catastrophic crashes in recent years. This hazard continues to threaten general aviation and high performance commercial jet aircraft.

Current methods and devices used to detect ice and determine its thickness are not practical due to the complex geometries and distribution of ice accretion encountered in typical flight environment, as well as the inability to measure non-localized ice accretion. Such methods and devices include visual observation, vibrating sensing probes, probes with optical sensors, and ultrasonic pulse echo sensors. Visual observation is crude, not suitable for measuring thickness of ice and is severely limited by darkness or other poor visibility conditions. Methods using probes are generally unnecessarily complex and the protruding probes cause undesirable drag. Installation of the pulse echo sensor requires drilling through the aircraft surface; and such a sensor can only measure localized ice thickness.

SUMMARY OF THE INVENTION

An illustrative device, or sensor array, in accordance with the invention includes a plurality of piezoelectric sensors or transducers. These transducers convert fluctuations in pressure and shear forces of the boundary layer flowfield, such as that experienced at the surfaces of aircraft structures, into corresponding electrical signals for monitoring a variety of aerodynamic performance parameters. The transducers also detect capacitance changes such as that produced by the presence of ice buildup or water. These signals provide useful information for the measurement of localized and non-localized ice thickness.

One particular embodiment of the invention comprises arrays of thin piezoelectric sensors and associated integrated microelectronics embedded in a compliant boot or blanket that can be applied directly onto the aircraft surface. The individual sensors may be constructed from a variety of materials including piezoelectric film such as PVDF and piezoelectric crystals such as lead zirconate-titanate (PZT) and lithium niobate. Use of such a compliant device is especially appealing for retrofit of aircraft. The device can be installed even on complex flow configurations without requiring modification of the body surface. The device is easily installed, passive, light-weight, and relatively low cost.

Advantageously, the piezoelectric transducers exhibit distributed capability for detection of the boundary layer flowfield. The transducers may be configured to monitor and detect the sum of forces at the boundary layer flowfield in a plurality of directions. Alternatively, the transducers may be configured to selectively monitor and detect forces in a single direction. This device enables the detection of vortices and a detailed analysis of boundary layer flow characteristics including the point at which laminar boundary flow becomes turbulent, i.e., boundary layer transition detection. These boundary layer flowfield characteristics provide measurements of a variety of aerodynamic performance parameters including warning of impending stall conditions due to leading edge ice accretion generated in-flight or due to high angle-of-attack.

Advantageously, sensors constructed in accordance with the present invention also exhibit distributed capability for the direct measurement of ice accretion including top wing ice generated while on the ground before take-off and runback refreeze ice generated by devices such as electro-thermal deicers. As will be appreciated by one skilled in the art, an integrated capacitive measuring capability provides self calibration of the piezoelectric sensors when in a known temperature and dielectric environment (i.e., air, water, ice). The sensors may be configured to directly measure ice thickness by measuring the changes in capacitance of the sensor due to the presence of ice.

The sensors in accordance with the invention overcome the disadvantages of individual point sensors by integrating the required number and distribution of sensor segments into a continuous array for distributed sensing capability. The size and shape of the array is chosen so as to cover the area of interest for which boundary layer flowfield information is desired. Such information preferably includes turbulence characteristics of the flowfield as well as ice identification, distribution and thickness. The sensors are critical for monitoring boundary layer turbulence and enable the detection of impending wing stall caused by ice accretions, high angle-of-attack, etc. As an advanced stall warning system, the present invention is superior to conventional systems in that it immediately and directly monitors the cause of stall—i.e. boundary layer separation on the upper surface of an airfoil which results in loss of lift. Conventional stall warning systems determine stall regions by measuring secondary parameters such as air speed and angle-of-attack. Stall may occur whenever wing lift is impaired, such as by damage or accumulation of insects, birds, frost, ice or heavy rain. Accordingly, direct and immediate monitoring of the flowfield is clearly desirable and beneficial.

Accordingly, means which monitor and analyze boundary layer flow provide a pilot with critical information. Advantageously, the present invention enables airflow parameters which indicate a wide variety of conditions to be sensed. Additionally, such parameters may be sensed in real-time or near real-time.

Accordingly, it is an object of this invention to provide a device which reliably and accurately provides in-flight measurements of boundary layer flowfield characteristics.

Another object of this invention is to provide a device for the measurement of vortex structures so as to understand more fully vortex dynamics, to optimize the design of an effective vortex generator, and to allow advanced warning and avoidance of impending vortex breakdown.

It is also an object of this invention to provide a device which has a distributed ice sensing capability and can be easily retrofit to existing aircraft without causing undesirable drag.

It is a further object of this invention to provide a device for the measurement of non-localized ice accretion which correlates boundary layer flow characteristics to ice thickness by using non-intrusive surface mount sensor arrays positioned downstream of the ice buildup.

It is a still further object of this invention to provide a device for the measurement of localized ice accretion which directly measures the thickness of ice on the sensor by measuring changes in capacitance.

BRIEF DESCRIPTION OF THE DRAWINGS

These and other objects, features and advantages of the present invention will become more readily apparent from the following detailed description of the invention in which like elements are labelled similarly and in which:

FIGS. 12 and 13 depict an embodiment of a self contained closed loop system for vortex control suitable for retrofit onto a wing;

DETAILED DESCRIPTION OF THE DRAWINGS

Figure 1:
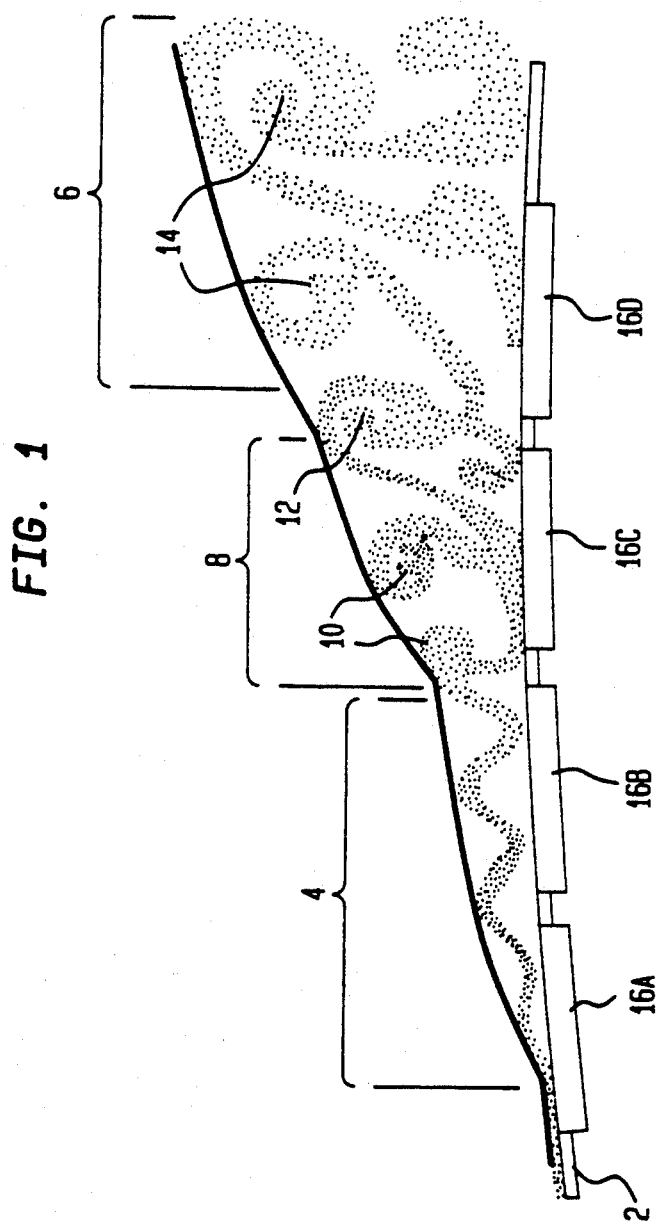
FIG. 1 depicts a typical airfoil section configured for boundary layer control showing laminar flow, transition, and turbulent boundary layers.

FIG. 1 illustrates a typical aerodynamic lifting surface 2, or airfoil, having a laminar flow boundary layer region 4, a turbulent flow region 6 and a transition region 8. Thin laminar boundary layer flow is observed in region 4 from the leading edge of surface 2 to a point at which transition begins. The beginning of transition region 8 is characterized by a thickening of the boundary layer and the appearance of small eddying pertubations 10 in the airstream. As the airstream progresses through transition region 8, certain airflow disturbances within a range of predictable oscillatory frequencies, known as Tollmien-Schlichting (T-S) waves, become amplified to form eddies 12 that cause a transfer of momentum from the higher energy air near an outer surface of the boundary layer to the low energy air at the surface. At this point the airstream enters region 6 and becomes turbulent, and comprises many large eddies 14 and is characterized by a relatively higher average velocity near the airfoil surface. The higher velocity creates greater surface friction with the airfoil which is evidenced as an increase in aerodynamic drag. Ideally, if the entire flow across the airfoil surface were laminar, the airfoil would encounter minimum resistance and maximum lift.

FIG. 1 also depicts a plurality of sensor segments 16A, 16B, 16C and 16D (collectively referred to as 16). For ease of illustration, each of sensor segments 16A-D is depicted as having an exaggerated thickness. The sensor segments are preferably mountable on the surface of airfoil 2 and, accordingly, may easily be retrofit onto an existing airfoil surface. Alternatively, sensor segments 16 may be actually embedded within airfoil 2. Advantageously, a plurality of sensor segments are employed to determine the nature of airflow over at least a portion of the airfoil. Preferably, each of sensor segments 16A, B, C and D is identical in structure and function. In the embodiment depicted in FIG. 1, transition between laminar flow and turbulent flow has been found to occur between sensor segments 16B and 16D. The location of the various regions depends on airfoil type, speed, angle-of-attack, wing location, flight altitude, etc.

Figure 2:
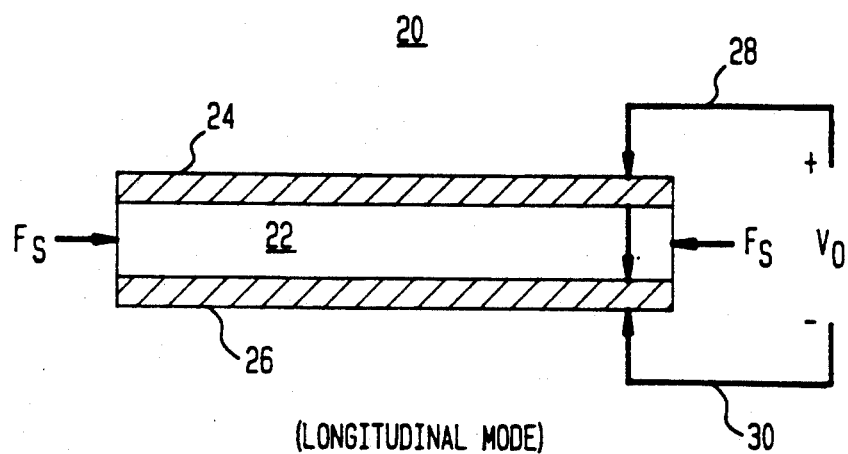
FIG. 2 depicts a portion of a sensor segment polarized in a first direction suitable for use as any of sensor segments 16 A-D of FIG. 1.

FIG. 2 depicts the active element 20 of a sensor segment suitable for use in any of sensor segments 16 A-D of FIG. 1. Active element 20 preferably is a polyvinylidene fluoride (PVDF) transducer film sensor comprising a polyvinylidene fluoride layer 22, a first low resistance contact 24 and a second low resistance contact 26. Conductive means 28 is attached to first low resistance contact 24 and conductive means 30 is attached to second low resistance contact 26. Illustratively, low resistance contacts 24, 26 are each metallization layers deposited or etched by conventional methods onto PVDF layer 22, such as aluminium or nickel metallization layers. Advantageously, layers 24, 26 may be patterned, such as by employing etching techniques, to yield a plurality of sensors associated with a single PVDF layer.

As will be appreciated by one skilled in the art, active element 20 has a certain amount of capacitance and may operate as a capacitor having a capacitance determined by the dielectric constant of PVDF layer 22, the area of metallization layers 24 and 26 and the thickness of PVDF layer 22 separating metallization layers 24 and 26.

The PVDF sensor is based upon the piezoelectric properties of polyvinylidene fluoride. Piezoelectricity is a capability of certain crystalline materials to change their dimensions when subjected to an electrical field or, conversely, to produce electrical signals when mechanically deformed. When used as a sensor to sense deformation, the deformation produces an output voltage proportional to the force applied on the film. PVDF has a broadband frequency response from near DC to over a megahertz enabling measurement of boundary layer forces and the like over a wide bandwidth. The piezoelectric effect of PVDF is extremely stable. Its poled internal structure remains stable under all but the most extreme conditions of temperature, mechanical shock, or externally applied voltage. A temperature over 120° C., an impact of several millions G's, or application of several thousand volts is required in order to depole the activated film.

Piezoelectric behavior is induced in appropriate material such as PVDF by poling, a polarization treatment which aligns the polar axes of the individual crystallites in the PVDF. Such a polarization treatment includes selective application of a high energy electric field at an elevated temperature. Polarized PVDF is commercially available as a thin polymeric layer (6-125 um) that has an ultra thin layer (500 A) of a conductor such as nickel or aluminum deposited on each side to conduct voltage. Advantageously, this conductor is a metallization layer which can be etched to form multiple sensors or sensor outputs, i.e., electrodes, on a single PVDF layer for one or two dimensional boundary layer profiling capability. The preferred piezoelectric polymer film that is the active element of the sensor is PVDF, although other piezoelectric materials may be employed based on, for example, temperature requirements. Suitable PVDF film is manufactured, for example, by Pennwalt Corporation under the trademark Kynar. If the operating temperature exceeds the Curie point of the film, about 120° C. for PVDF, the film depolarizes and is no longer piezoelectric.

Table I lists physical and electrical properties of an illustrative PVDF sensor in accordance with the invention.

TABLE I

| Area | 10 mm |
|---|---|
| Thickness | 28 μm |
| Electrodes | Aluminized on both sides |
| Piezo-electric Strain Constants | $d_{31} = d_{33} = 23 \times 10^{-12}$ (C/m²) (N/m²) $d_{32} = 3 \times 10^{-12}$ (C/m²) (N/m²) |
| Relative Dielectric Constants | $\epsilon/\epsilon_o \approx 12$ @ 10 KHZ |
| Break Frequency | 300 Hz |
| Thermal Time Constant | 0.014 Sec (11.4 Hz) |
| Capacitance | $379 \times 10^{-12}$ F/cm² @ 10 KHz (9.8 nF) |
| Maximum Operating Temperature | 100° C. |

The generated charge on the sensor segment is generally the result of the combined mechanical deformation (tension, compression and shear) of the PVDF layer in all directions. The sensor's sensitivity is proportional to the piezoelectric strain constant for the direction of the applied force. Accordingly, the sensor is capable of detecting various components of airflow.

Figure 4:
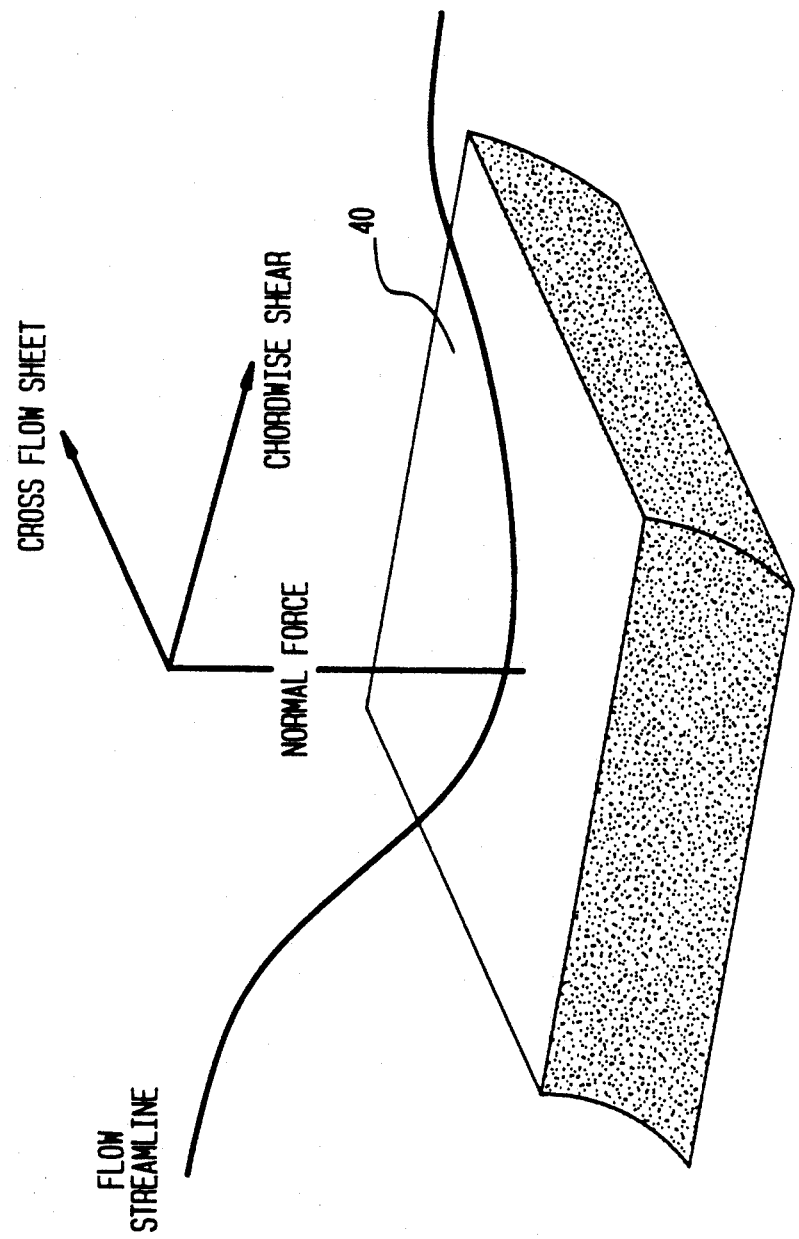
FIG. 4 depicts the nature of forces which may be applied to a sensor segment due to airflow.

FIG. 4 depicts the nature of forces which may be applied to a sensor segment 40 due to airflow. Specifically, fully developed turbulent flow produces normal forces, streamline or chordwise shear forces, and cross-shear forces.

The PVDF sensor output is proportional to the stress applied on the PVDF film and generally has its strongest response when the stress is in the plane of the film, although the film may be selectively polarized along a desired axis. Accordingly, the film's output due to stress in the plane of the film may be the integral of the surface shear stress components in the flow and cross-flow directions. The equation that defines the average friction coefficient "F" at any instant over a PVDF film segment in the flow direction is:

$$F = 1/L \int_O^L [2\tau(x)/pv^2]dx \quad (1)$$

where:
L = segment length
p = density
v = velocity
½pv² = free stream dynamic pressure
τ(x) = wall or surface shear stress Advantageously, since the PVDF sensor does not have a DC response, there are no problems associated with bias or drift. The PVDF sensor does respond to stress variations above a design minimum frequency and if "F" is considered to be time varying, F(t), then the PVDF sensor output p(t) can be expressed as:

$$p(t) = \int_o^t g(q)r(t - q)dq \quad (2)$$

g(q) = PVDF sensor impulse response
r(q) = Input stress applied to film by the total excitation including the boundary layer excitation
q = time delay variable Although the generated charge on the sensor is generally the result of the PVDF layer's combined mechanical deformation in all directions, the PVDF film may be made especially sensitive in a desired direction. Specifically, by selectively stretching the PVDF layer as the layer is polarized, a PVDF layer is produced having a preferred direction of sensitivity.

The PVDF element 20 depicted in FIG. 2 is polarized in a direction so as to produce an output voltage $V_o$ across metallization layers 24, 26 upon the application of a force in a shear direction as indicated by the arrows $F_s$. In other words, PVDF active element 20 is polarized in a direction so as to be especially sensitive to application of force in the $F_s$ direction.

Figure 3:
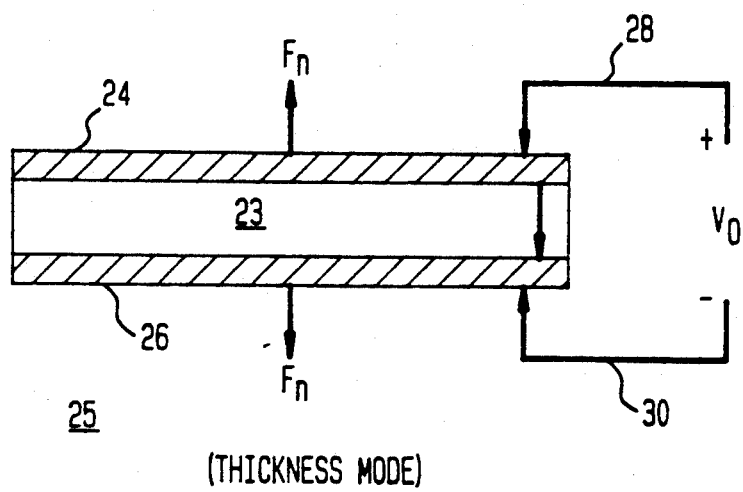
FIG. 3 depicts a portion of a sensor segment polarized in a second direction suitable for use as any of sensor segments 16 A-D of FIG. 1.

The PVDF element 25 depicted in FIG. 3 is polarized in a direction so as to produce an output voltage $V_o$ of increased magnitude across metallization layers 24, 26 upon the application of a force in a normal direction as indicated by the arrows $F_n$. Accordingly, sensor segment 25 is especially sensitive to application of force in the $F_n$ direction.

Figure 5:
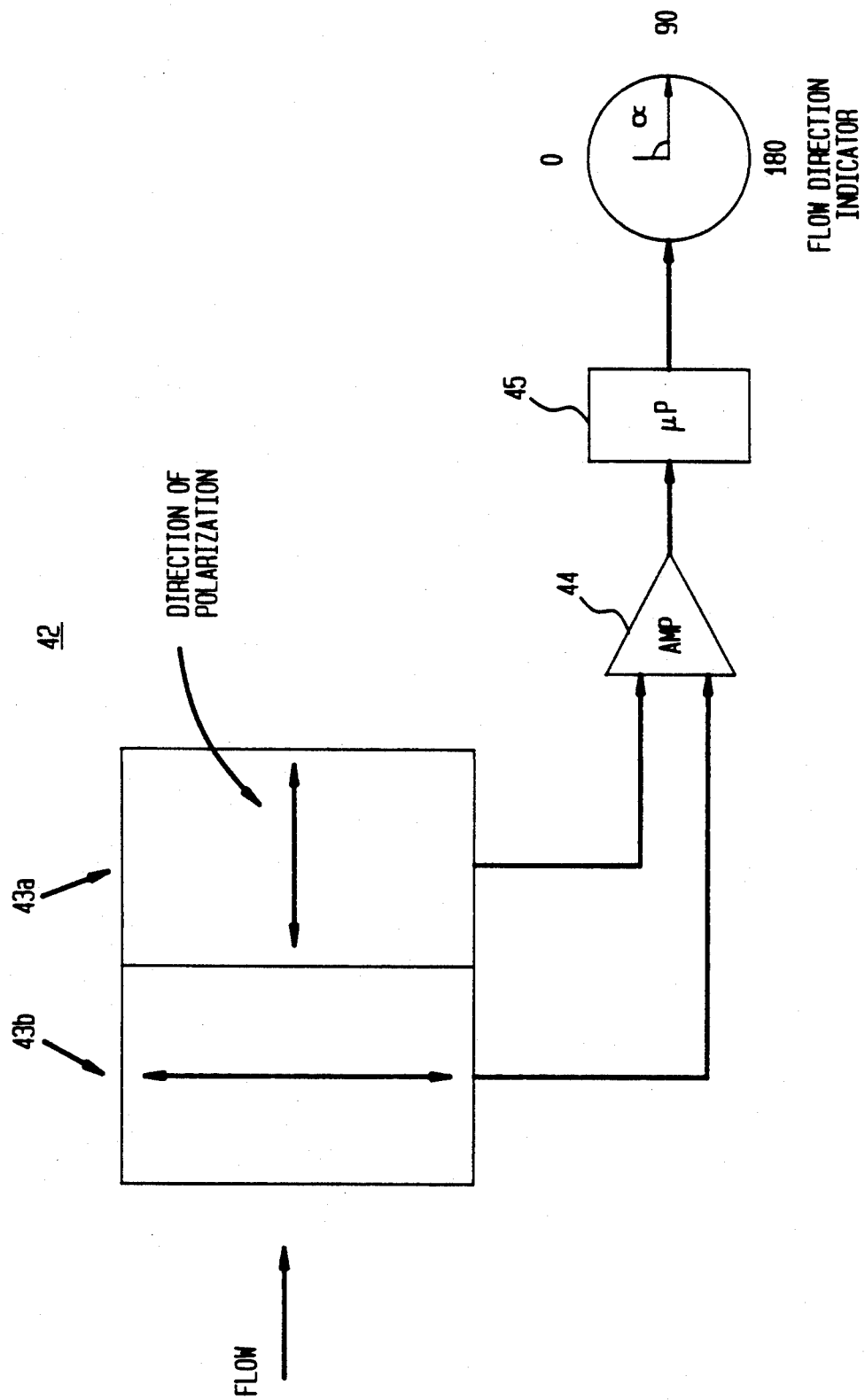
FIG. 5 depicts a specific sensor configuration for monitoring flow direction.

To detect crossflow, the present invention takes advantage of the difference in the piezoelectric constants in the plane of the PVDF film. As the film is electrically polarized, it may be stretched to significantly enhance the response of the $e_{31}$ piezoelectric constant, such that it is 80% greater than the $e_{32}$ piezoelectric constant. As shown in FIG. 5, orientation of one PVDF polarization strip 43a from another PVDF polarization 43b enables the computation of a resultant vector using 2 closely, spaced or overlapping sensors. Signal processing electronics including amplifier 44 and microprocessor 45 are then employed to compute a resultant flow vector.

Figure 6:
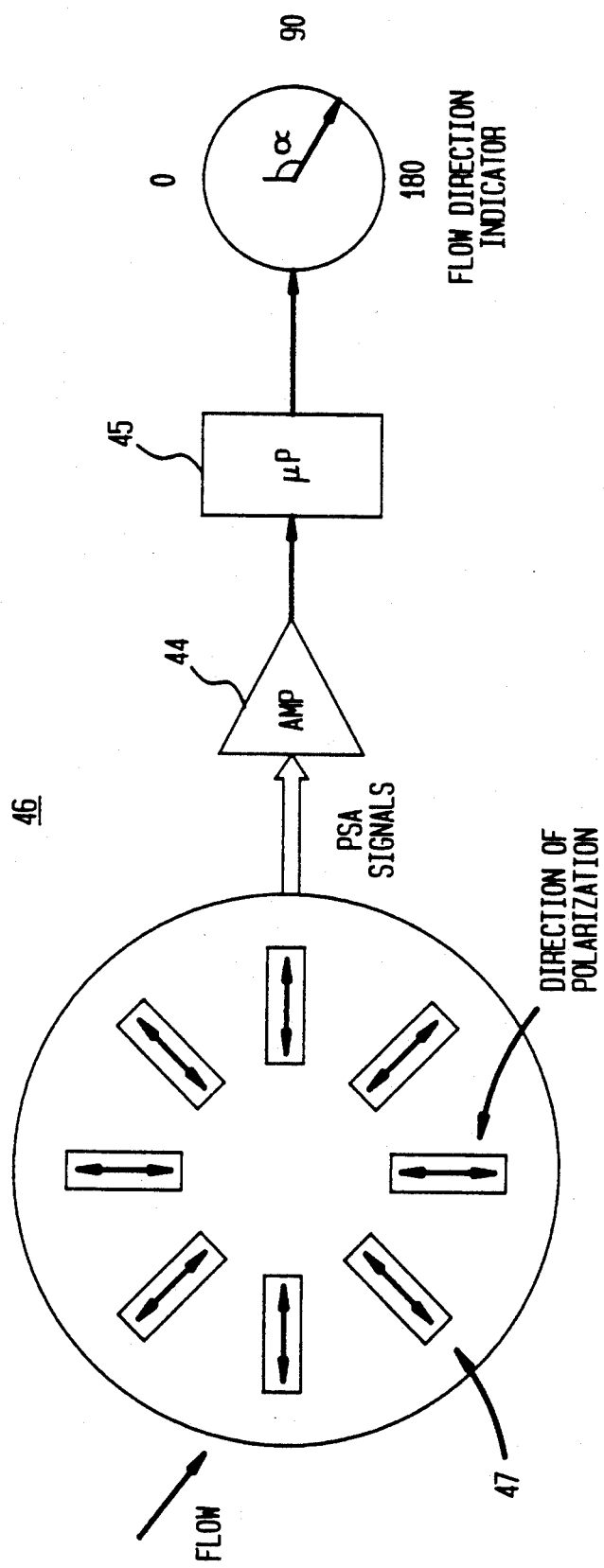
FIG. 6 depicts another sensor configuration for monitoring flow direction.

FIG. 6 depicts another device having a circular arrangement that utilizes a plurality of long narrow PVDF strips 47 positioned in a star or wheel spoke configuration, with the polarization vectors positioned on the radii of the circle.

Advantageously, sensor segments 16A-D of FIG. 1 may include sensor elements of the type depicted in FIGS. 2,3,5, and 6, as well as other sensors such as static pressure transducers and thermocouples. By combining a plurality of sensor segments, a piezoelectric sensor array (PSA) may be formed. The sensor signals may then be amplified and processed in a computer to determine boundary layer parameters including local flow vectors, transition location, shear and pressure forces, etc. A series of these sensor segments or PSAs may be distributed over an entire vehicle or wing surface, linked with a common databus, and tied to a central processor. Signal processing software may then be employed to generate a 2-dimensional flowfield at the surface, and predict 3-dimensional flowfield patterns such as vorticies.

As will be appreciated, the signal response of each PVDF sensor segment depends on the segment's mounting configuration. A relatively low frequency response as well as relatively low signal strength are produced when the PVDF film is mounted directly to a rigid surface. Because the strongest response occurs when a stress is applied along the length of the film's sensitive axis, normal forces produce their strongest response when the PVDF film is mounted in a configuration to stretch the film, as in a case where the PVDF film is stretched over a foam layer and/or air cavity. A preferred way in which this is be accomplished is by positioning a thin compliant material between the film and the surface to which it is mounted, allowing the film to respond to normal pressure variations. Additionally the compliant material may have openings therein to equalize the pressure in the cavity.

Signals generated by PSA sensor segments may also be the summation of a plurality of noise excitation sources. For example, pyroelectric properties of PVDF film allow the detection of thermal variation as well as those generated mechanically or acoustically. One of the major problems in use of pyroelectrics for fluid dynamic applications is proper interpretation of the generated composite signal. The present invention may employ a combination of electrical and mechanical filtering to eliminate unwanted structural and thermal noise that could otherwise lead to misinterpretation of acquired data. Similar filtering techniques are preferably employed for electro-magnetic interference and radio frequency interferance if the sensors are used in environments having high power communication or radar equipment.

The piezoelectric film will respond to thermal effects from the boundary layer flow and from thermal variations that may occur in the mechanical mounting to which the film is thermally connected. At operating temperatures below about $-40°$ C. to $-50°$ C., the piezoelectric effect will be greatly reduced, since this is the glass transition temperature. Reheating the film above $-40°$ C., however, will return the piezoelectric effect. Temperature exposure higher than approximately $120°$ C. for the PVDF layer is not recommended due to effects of depoling.

Figure 7:
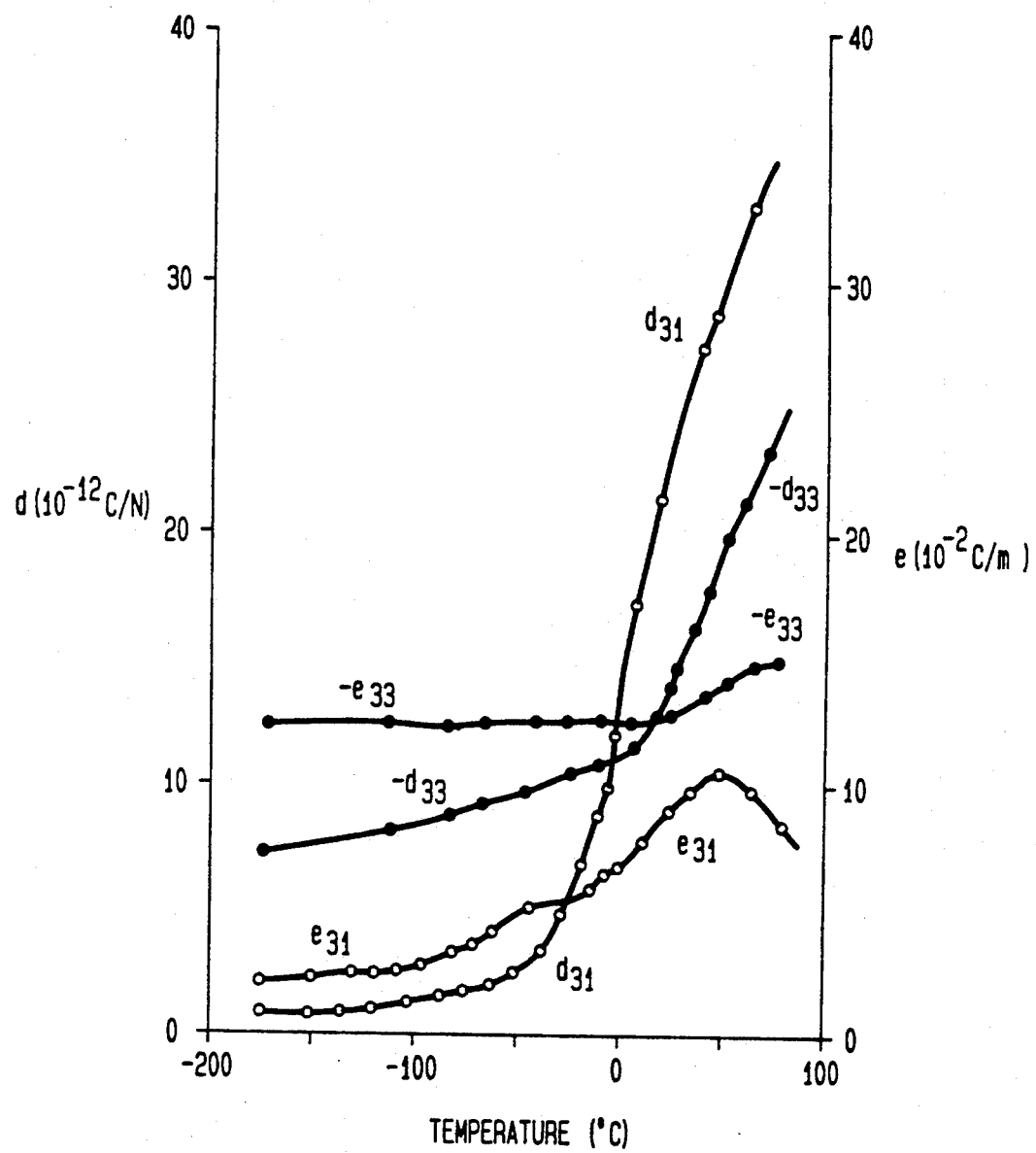
FIG. 7 is a graph depicting the temperature dependence of the piezoelectric constants, e and d.

FIG. 7 shows the temperature dependence of the piezoelectric constants, e and d. The reduction of the $e_{31}$ constant with reduced temperature is significant for the boundary layer transition detection (BLTD) application but not to the extent of the $d_{31}$ constant. The percent change in gain due to the $e_{31}$ constant change is less than approximately 25% from $0°$ C. to $-50°$ C. Dielectric constant d is the short circuit charge density developed across the PVDF material for a stress applied to the PVDF material, and the strain developed on the PVDF material due to an electric field applied across the PVDF material. As will be appreciated by those skilled in the art, large temperature gradients across a sensor array require temperature compensation techniques to normalize e. Such temperature compensation techniques are known and do not require further detail. For flight speeds up to approximately 0.8 Mach at an altitude between approximately 5,000 and 30,000 ft., the stagnation temperature will vary between $\pm 40°$ C., within the desired operating temperature range. The stagnation temperature is the temperature at the leading edge of a wing and is generally greater than the ambient temperature.

The piezoelectric film also exhibits a current response that depends on the rate of change of temperature rather than temperature directly. Preferably, thermal isolation of the present invention from the attached structure is employed. A highly insulative material is placed between the sensor and the structure and will significantly drop the thermal time constant of the material below the frequency range of interest for most applications. Use of a PVDF film sensor insulated with, for example, polyethelene foam, will produce a thermal time constant of 0.14 seconds, or frequency cut-off of 11.4 Hz according to the equation:

$$T = \frac{Pt^2 C_P}{K} \quad (3)$$

where
$P$ = mass density = $1.78 \times 10^3$ kg/m$^3$
$t$ = film thickness = $28 \times 10^{-6}$ m
$C_p$ = heat capacity = 1300 Joule/kg°K.
$k$ = conductivity = 0.13 Joule/sec.m°K.

Thermal variations above this frequency will be attenuated and not interfere with the higher frequency pressure and shear signals. This low frequency thermal effect can be filtered out by selecting appropriate electrical and/or mechanical time constants. This technique provides effective filtering of pyroelectric noise.

Figure 8:
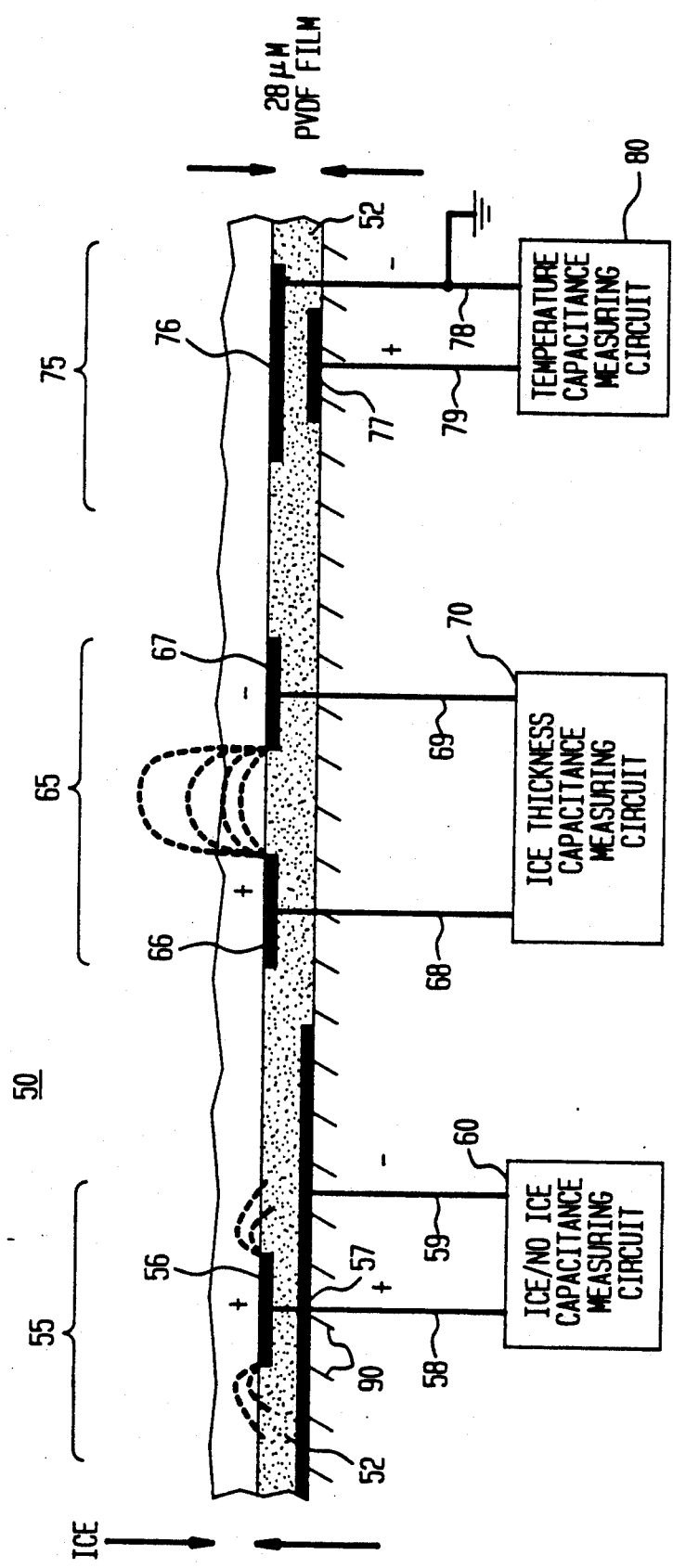
FIG. 8 depicts one embodiment of a sensor segment comprising a PVDF layer having metallization patterns on each side of the layer.

FIG. 8 depicts a preferred embodiment of the PVDF sensor for direct localized measurement of ice presence and thickness on a surface. A sensor segment 50 is shown comprising a PVDF layer 52 having metallization patterns on each side of the layer. These metallization patterns form three sensors, namely, an ice presence sensor 55, an ice thickness sensor 65 and a temperature sensor 75. PVDF layer 52 does not have to be polarized for proper operation of sensors 55, 65 and 75, although the sensors will operate with a polarized PVDF layer. In one particular embodiment, sensor segment 50 is mounted directly on a surface 90 of an aircraft.

Ice presence sensor 55 operates as a capacitive sensor and comprises first metallization layer 56, second metallization layer 57 and PVDF layer 52 therebetween. Metallization layer 56 functions as a first electrode and is connected to a capacitance measuring circuit 60 by way of a lead 58. Metallization layer 57 functions as a second electrode and is connected to capacitance measuring circuit 60 by way of a lead 59. Layers 56 and 57 are located on opposite sides of PVDF layer 59. Preferably, layer 57 operates as a ground plane and the area of layer 57 is significantly greater than the area of layer 56. As will be appreciated by one skilled in the art, the dashed lines between electrodes 56 and 57 of ice presence sensor 55 are electric field lines. Accordingly, existence of ice in an area surrounding electrode 56 will interfere with the electric field and cause circuit 60 to detect a change in the capacitance value. The changes in the capacitance value occur due to the difference in the dielectric constants of air and water or ice. The capacitance is determined in part by the medium through which the electric field lines pass. In the embodiment shown in FIG. 8, capacitance measurements include the effects of the PVDF film as well as the water or ice.

Ice thickness sensor 65 operates as a capacitive sensor and comprises first metallization layer 66, second metallization layer 67 and the materials (air and PVDF layer 52) separating the two layers. Each of these two metallization layers functions as an electrode, is located on the same side of PVDF layer 52 and is exposed to the environment. Layers 66 and 67 are preferably similar in shape and size and are connected to an ice thickness capacitance measuring circuit 70 by way of leads 68 and 69, respectively. As will be appreciated by one skilled in the art, the electric field as indicated by the dashed lines between layers 66 and 67 will be affected by the accretion of ice between and in proximity with layers 66 and 67. Accordingly, circuit 70 will detect a change in the capacitance value as the thickness of ice changes. Layers 66 and 67 may be mounted on practically any nonconductive surface and need not be mounted on PVDF layer 52.

Temperature sensor 75 also operates as a capacitive sensor and comprises first metallization layer 76, second metallization layer 77 and PVDF layer 52 therebetween. The PVDF layer between metallization layers 76 and 77 has a dielectric constant which varies in a known manner with temperature as will be discussed in conjunction with FIG. 8. Each of layers 76 and 77 functions as an electrode and is located on opposite sides of PVDF layer 52. Metallization layers 76 and 77 are connected to a temperature capacitance measuring circuit 80 by way of leads 78 and 79, respectively. As the temperature changes, the dielectric constant of the PVDF film between electrodes 76 and 77 changes thereby causing the capacitance of sensor 75 to change. Such a change in capacitance is detected by circuit 80. Alternatively, the PVDF layer separating electrodes 76 and 77 may be suitably doped to increase its dielectric sensitivity with respect to temperature.

Each of circuits 60, 70 and 80 measures capcitance of its associated sensor. Such capacitance depends on the dielectric constant of the material in the gap between the two electrodes of any of the sensors, as well as on fringe effects. Ice and water have dielectric constants about eighty times greater than air, thus their presence will have a significant effect on detected capacitance values. Accordingly, the presence of water and ice can be detected. Water may be differentiated from ice by employing temperature sensor 75. Capacitance changes occurring above a few degrees centigrade are assumed to be due to water. Temperature sensor 75 may also be employed for temperature compensation.

More specifically, operation of sensors 55 and 65 is dependent on the fringe fields around the edge of the electrodes, since it is only the fringe fields that pass through the ice or water layer to be sensed. Accordingly, the edge length of the electrodes determines the maximum capacitance change possible when the sensor is covered with water or ice. Maximizing the ratio of electrode edge length to total electrode area results in the greatest change in capacitance under ice conditions for a sensor of given area.

The change in capacitance of a sensor is linearly proportional to ice thickness provided that the ice thickness is significantly less than the distance between the conductive electrodes. By employing sensors with different electrodes, the sensitivity to ice may be traded off against the ability to measure greater ice thickness. A sensor with small spacing between electrodes will exhibit a large change in capacitance when covered by a thin layer of ice, however, the capacitance change will be linear only for very thin layers of ice. A sensor with greater spacing between electrodes is less sensitive to ice accretion but has a correspondingly greater ice thickness measurement range. Accordingly, sensor 55 is relatively sensitive and is employed to determine whether or not ice or water is present. This is accomplished by circuit 60 determining whether the measured capacitance is above or below a threshold value. In one particular embodiment, the capacitance of sensor 55 without ice or water present was found to be 400 pF, while the capacitance with ice or water present was found to be 440 pF.

Figure 9:
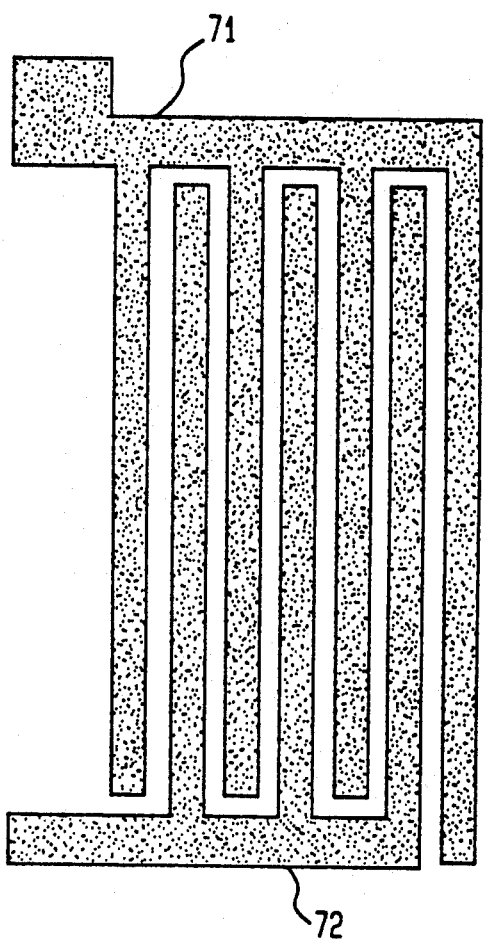
FIG. 9 depicts a specific embodiment of sensor 65 of FIG. 8.

A specific embodiment of sensor 65 is depicted in FIG. 9 and has electrodes 71 and 72. In this embodiment, the capacitance without ice or water was found to be 25 pF, while the capacitance with one-eighth inch thick ice or water was found to be 125 pF.

Advantageously, sensor 55 may also be monitored similarly to any of the sensors depicted in FIGS. 5, 6, 14, 15 provided that the PVDF film is polarized. Accordingly, sensor 55 provides information relating to the presence of ice as well as information relating to airflow. Advantageously, the sensors of the invention can withstand the high force environment of existing pneumatic and electroexpulsive deicing boots.

Advantageously, sensor 55 is a point sensor capable of sensing localized ice and employing a capacitor of relatively small physical size. Only ice in close proximity to the sensor has an effect on the capacitance. Several point sensors such as sensor 55 may be connected in parallel so that their capacitance will reflect the average ice thickness on all such sensors, providing a distributed measurement of, for example, ice accretion. Alternatively, a single large sensor strip as opposed to several smaller ones may be employed. The sensor strip may be sufficiently large so as to cover an entire wing surface. Such an embodiment identifies the presence of ice on the sensor strip, but not the location of the ice or how much ice exists on the sensor strip. A preferred configuration is an array of independently wired sensors such as sensor 55 connected to a multiplexer or scanning device. Advantageously, such an embodiment identifies ice presence and determines ice thickness as well as location, thus yielding true ice distribution measurements. A plurality of sensors 65 may be connected in parallel, as may a plurality of sensors 75.

In addition to detecting ice accretion by direct contact as accomplished by the device of FIG. 8, ice accretion can be detected by employing sensors such as those depicted in FIGS. 5, 6, 14, and 15. These sensors detect and monitor airflow.

The flow development over an aerodynamic surface such as an airfoil is extremely sensitive to the nature of the surface geometry. If the thickness of the boundary layer is of the same magnitude as the roughness height of leading edge ice formation, an abrupt change in the boundary layer structure can result. Surface mount transducers located downstream of the ice can be used to detect the increased spectrum level of the velocity and pressure fluctuations beneath the boundary layer. A major advantage of this type of transducer is its ability to directly monitor the aerodynamic performance degradation due to non-localized ice accretion, enabling a distributed ice sensing capability.

Figure 10:
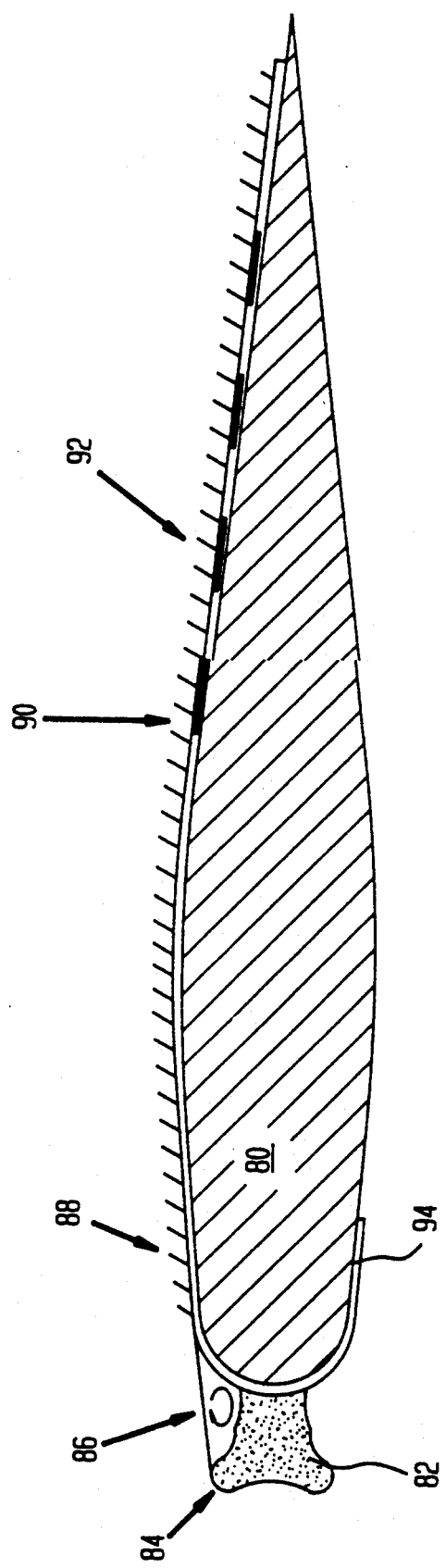
FIG. 10 depicts a typical airfoil section with leading edge ice accretion configured for ice detection.

FIG. 10 depicts a typical airfoil 80 having an ice formation 82 on the leading edge of the airfoil. Horns 84 of ice formation 82 cause the airflow to separate away from the surface of airfoil 80 forming a separation bubble 86 downstream of horn 84. The boundary layer is first laminar and at some point after separation the transition to turbulence flow begins. If the ice accretion is minimal or the angle-of-attack is low, the flow reattaches to the surface at some point 88 aft the ice formation where the pressure becomes approximately equal to that of a turbulent boundary layer without separation. With increased ice buildup or at a high angle-of-attack, the pressure on the surface of the airfoil does not recover and the boundary layer remains separated. This loss of circulation on the upper surface of the airfoil results in an abrupt decrease in lift referred to as stall.

FIG. 10 also depicts a plurality of sensor segments 92 to detect the boundary layer flow. Preferably, the sensors are located downstream of the ice and are mounted within a boot or cuff 94 which is retrofit onto the wing. Alternately the sensors may be embedded within the aerodynamic surface. The sensors are employed to detect the increased power spectrum level of the velocity and pressure fluctuations within boundary layer 90 due to the ice formation. The sensor's output may be analyzed using, for example, power spectral density to track changes in the energy bands of the boundary layer, and total root-mean-square (RMS) voltage levels to track changes in the transition location. A major advantage of such a sensor configuration is its ability to directly monitor the aerodynamic performance degradation due to the non-localized ice accretion. This technique reliably detects the presence and aerodynamic effects of ice without the requirement of the sensor being directly underneath the ice.

Vortices are a phenomena in which aerodynamic suction is generated along the top surface of an airfoil such as a wing thereby reducing drag and promoting attached flow over the wing. A thrust component as well as a lift component are produced and enable the aircraft to maneuver at a higher energy level, i.e., quicker and with more agility. Sensor arrays integral to the airfoil skin are used to detect vortex separation and breakdown of airflow and can be used in an active control feedback system. Breakdown of airflow is highly sensitive to obstacles downstream of the bursting point, i.e., the point at which laminar flow becomes turbulent.

Figure 11:
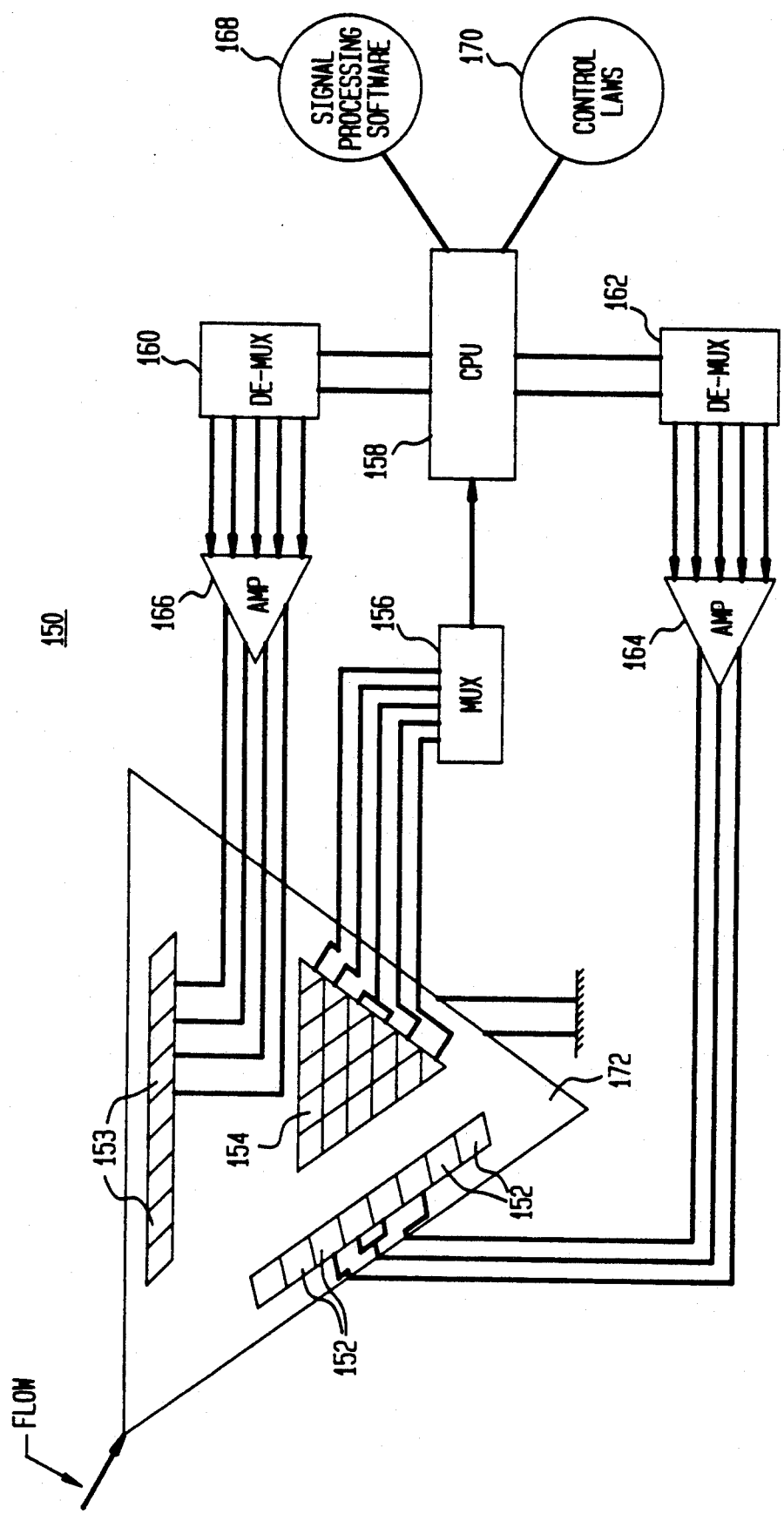
FIG. 11 depicts a closed loop system for vortex control and detection.

FIG. 11 depicts a closed loop system 150 for vortex control and detection comprising active vortex generators (AVGs) 152, 153, a piezoelectric sensor array (PSA) 154, a multiplexer 156, a central processing unit (CPU) 158, demultiplexers 160, 162, amplifiers 164, 166, signal processing software 168 and control law software 170. AVGs 152, 153 and PSA 154 are mounted on a wing 172.

Vortex generators 152 and 153 are actuatable devices which generate energetic vorticity dominated airflow. Preferably, these devices are integral to the airfoil surface and independently actuatable. Illustratively, generators 152 and 153 include piezoelectric arrays embedded in the wing near the leading edge. A variety of other systems may be employed to generate vortices in active vortex control system 150 including the following: a heating element, blowing and/or sucking through spanwise slots, acoustical means operating through spanwise slots, and mechanical devices such as a vibrating ribbon or microvanes.

PSA 154 comprises a plurality of PVDF film sensors which detect the nature of airflow near the surface of the sensors, therewith, including temporal and spatial aspects. The sensors, illustratively of the type depicted in FIGS. 5 and 6, are mounted in such a manner that dynamic surface pressure and shear stresses due to the flowfield induce strong electrical signals. The sensor arrays are synchronized to record flow response to all input signals. The vortex footprint or signature on the upper wing surface is measured with the preferably two-dimensional piezoelectric sensor array positioned on the suction or upper surface of the wing.

Multiplexer 156 multiplexes the plurality of signals from PSA 154 and transmits a resultant multiplexed signal to CPU 158 which employs a vortex detection algorithm 168 for analysis of detected signals and provides the pilot with the results. Various analog and digital signal identification techniques may be applied for analysis of the vortex flow profile at the region adjacent the wing surface. For example, Fast Fourier Transform (FFT) real-time signal processing algorithms may be employed to determine frequency, phase, energy content, and turbulence level from sensor output voltage signals. Spatial RMS averaging of the cross-shear component characteristic of recirculating vortex flow is used to interpret detected signal profiles. System software performs compensation and comparison of all sensor outputs, along with filtering and averaging to characterize the vortex flow phenomena. Preferably, vortex detection algorithm 168 is a real-time subroutine that samples only cross-shear vector components of the boundary layer flow induced signal and computes band-limited RMS power spatial distributions. A vortex "burst" or breakdown is identified as the region of maximum slope on the power distribution. This slope is then controlled for increased or decreased vortex breakdown stability. Preferably, CPU 158 contains graphic display software to provide real-time display of streamwise pressure and shear stress components of the vortex flowfield.

Demultiplexers 160, 162 are provided with multiplexed signals from CPU 158 and demultiplexes those signals which are then amplified by amplifiers 164, 166 and applied to AVGs 152, 153, respectively. Control law software 170 implemented by CPU 158 is employed to selectively actuate generators in AVGs 152, 153 or portions thereof. Depending on input provided by PSA 154, it may be desired to only actuate AVG 152 and not AVG 154, or to only actuate some of the actuators in AVG 152 and/or some of the actuators in AVG 153. If the bursting region is to be shifted for any reason, vortex control software 168 determines the optimal control method to be implemented. Vortex flow fields are distinguished from streamwise turbulent flow by vortex detection algorithm 168.

The system depicted in FIG. 11 is a closed loop system since the nature of airflow as monitored by PSA 154 ultimately controls AVGs 152, 153 which then affect such airflow. In other words, the system is self monitoring and does not require operator intervention. Alternately, an open-loop system in which a pilot directly control AVGs 152, 153 may be employed as may any suitable number of PSAs.

FIGS. 12 and 13 depict specific embodiment of a self contained closed loop system 200 for vortex control employing AVGs 202, 203, PSAs 204, 205 and CPUs 208, 209. Each of these elements is preferably embedded within the aerodynamic surface or mounted within AVG boot, or cuff, 210 which is retrofit onto a wing 220. AVG boot 210 is preferably constructed from urethane and provides a means by which existing aircraft can be retrofit with a vortex control system.

As streamwise vortices develop in the boundary layer, local variations in the surface pressure fluctuations occur. Preferably, the PSAs are sufficiently sensitive and closely spaced so as to detect the fluctuating normal pressure and cross-shear stresses due to the rotating vortex flowfield, as well as the vortex spacing, shear vector and shedding frequencies. The arrangement of the elements of the PSAs captures the periodic nature of the pressure variations, as well as provides such information as whether or not the vortices are moving or stationary. For the moving crossflow vortices, a time series analysis of the signals output by the sensors provides the frequency of the most amplified vortex. The sensor signals are analyzed and discriminate different flow regions and thereby distinguish between disturbed and undisturbed boundary layers. This data is useful in the quantification of the flow physics occurring during vortex breakdown.

Additionally, an array of flush-mounted orifices may be provided in the upper wing surface to provide pressure distribution patterns for calibration of the piezoelectric sensors.

Figure 14:
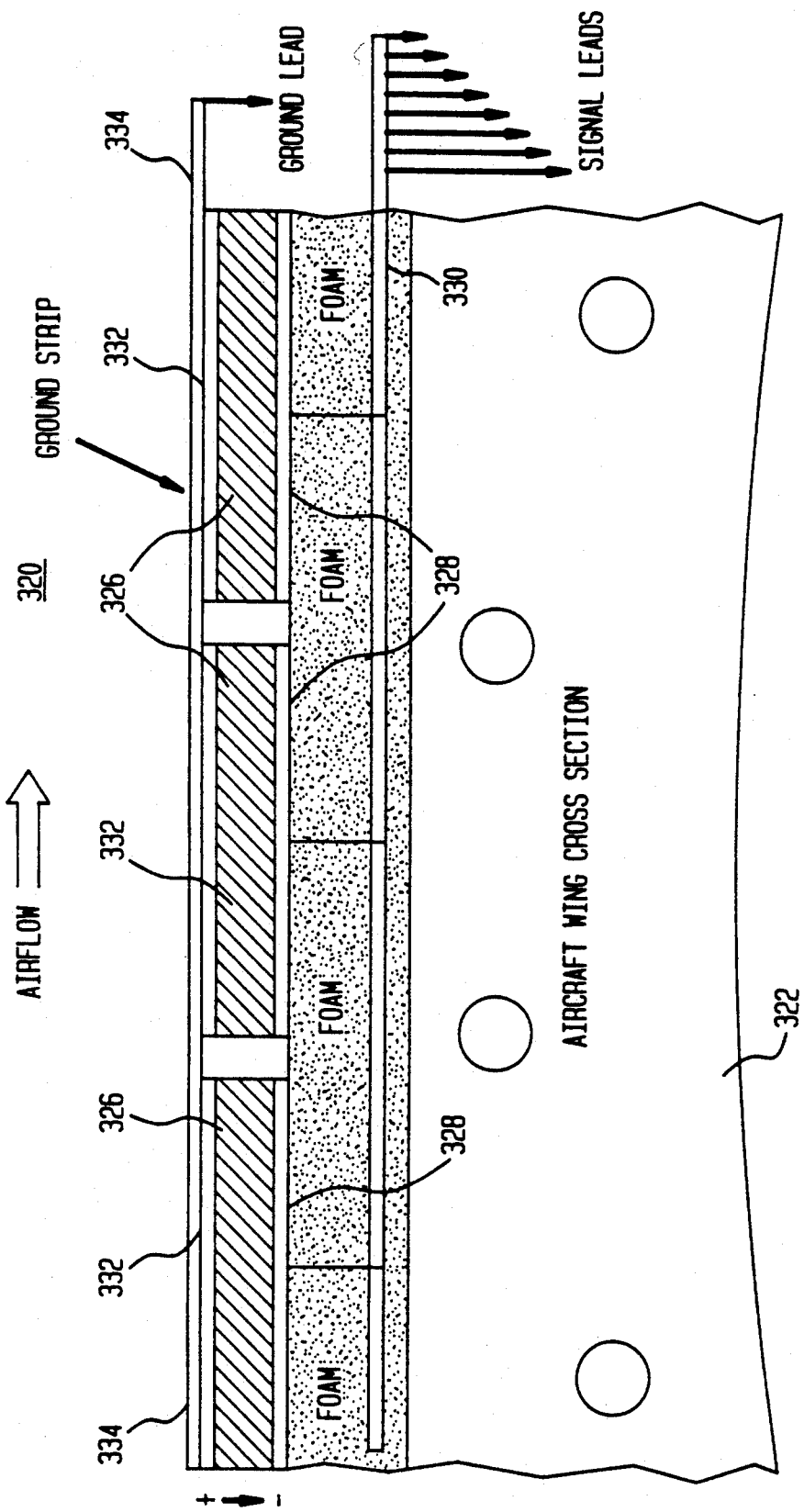
FIG. 14 depicts an illustrative sensor array mounted on a surface of a wing.

FIG. 14 depicts an illustrative sensor array 320 mounted on a surface of a wing 322. Sensor array 320 is particularly well adapted for boundary layer transition detection and analyses. Sensor array 320 may also be employed for analysis of vortex flows. More specifically, sensor array 320 is attached to one side of foam layer 324 by an adhesive. An opposite side of foam layer 324 is attached to the surface of wing 322 also by adhesive. Illustratively, foam layer 324 is 1/32 inch thick double adhesive coated polyethylene foam tape. Advantageously, use of foam layer 324 significantly increases the sensitivity of the sensors, especially for shear components. For example, without the foam layer, sensor output due to $e_{31}$ is generally relatively negligible. However, with the foam, sensor output due to $e_{31}$ is significant, easily measurable, and very useful in determining shear component forces. Sensor array 320 includes a plurality of piezoelectric sensing elements 326 which are preferably constructed from polarized PVDF film illustratively 10–110 um thick. Each of sensing elements 326 includes a first signal metallization layer 328 connected to a signal bus or harness 330. Bus 330 provides signals output by each of sensing elements 326 to signal processing means (not shown) for determining and monitoring the nature of airflow and/or strain detection and analysis including surface ice detection. Each of sensing elements 326 also includes a second signal metallization layer 332 connected to a common ground strip 334.

Advantageously, sensing elements 326 are configured such that some are particularly sensitive to normal force, some are particularly sensitive to streamline shear, and some are particularly sensitive to cross-flow shear as indicated in FIGS. 5 and 6. By individually monitoring each of sensing elements 326 or select groups of the sensing elements, the nature of airflow and parameters such as stall conditions and ice accretion may be determined. Surface pressure data is analyzed to warn of impending wing stall. As will be appreciated, ice accretion alters the airfoil contour and introduces disturbances in the boundary layer that can be detected far downstream of the ice accretion.

Figure 15:
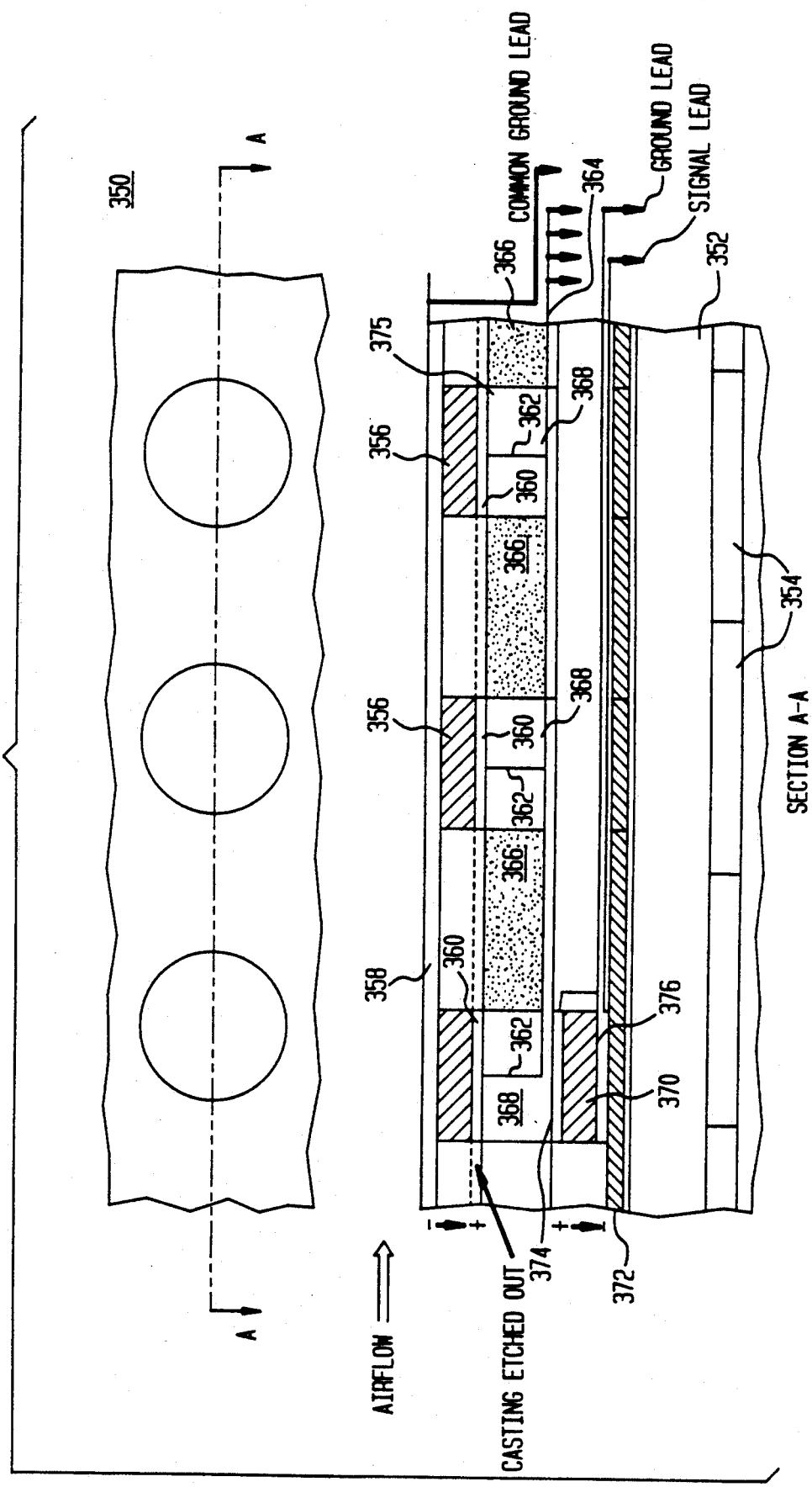
FIG. 15 depicts another illustrative sensor array.

FIG. 15 depicts another illustrative sensor array 350 in accordance with the invention. Sensor array 350 is mounted on one side of aircraft skin 352. Damping material such as polyurethane foam strips 354 may optionally be attached to an opposite side of aircraft skin 352 to improve damping characteristics.

Sensor array 350 comprises a plurality of polarized PVDF sensing elements 356 each having a common ground metallization coating 358 exposed to the environment. PVDF sensing elements 356 also include metallization layers 360 which are individually connected to a signal processing means (not shown) by way of leads 362 and bus 364. A foam layer 366 having bores 368 therethrough is attached on one side to sensing elements 356 and on an opposite side to structural sensors 370. Illustratively, foam layer 366 is 1/32 inch thick and sensing elements 356 are 28 um thick. Sensor array 350 preferably includes a plurality of structural sensors 370 in proximity with each bore 368, however, FIG. 15 depicts a single structural sensor for the sake of clarity, although any suitable number of sensors may be attached to the aircraft skin. Foam layer 366 is attached to sensing elements 356 and to structural sensors 370 by an adhesive such as a spray adhesive. Sensor array 350 also includes an insulating layer 372 such as a layer of Mylar tape to electrically insulate the sensor from the aircraft surface 352. Preferably, Mylar tape layer 372 is attached to aircraft skin 352 by way of spray-on adhesive.

As will be appreciated, layer 366 is a thin compliant material which permits the PVDF film to respond freely to pressure variations. By mounting the PVDF film in a taut manner and stretched over bores 368, a diaphragm sensor is formed.

Structural sensors 370 are illustratively of the type depicted in FIGS. 2 and 3 and include metallization layers 374 and 376. "Structural" signatures or "fingerprints" obtained from these sensors identify structural noise excitation and are employed in a common mode rejection circuit to eliminate large components of structural noise detected with the sensing elements, in a manner as discussed previously. Sensing elements 356 preferably operate in a manner similar to sensors depicted in FIGS. 2, 3, 5, 6. Additionally, and as will be appreciated by those skilled in the art, a capacitor is formed by metallization layer 360, bore 368 and metallization layer 374. This capacitor functions as a diaphragm mount airflow sensor 375 and has a capacitance value determined by the area of layers 360, 374, the separation distance or gap between these two layers and the dielectric constant of the material in the gap. In this embodiment, the gap material is preferably air thus advantageously permitting metallization layer 360 to be forced partially into bore 368 by the freestream static pressure of the air thereby decreasing the separation distance and changing the capacitance value. Bores 368 and metallization layers 360, 374 need not be the same shape. For example, bores 368 may be circular while layers 360, 374 may be square, or vice versa. Illustratively, bores 368 have a diameter of 10 mm.

As will be appreciated, airflow over sensors 350 will cause forces to be applied to metallization layer 358. Sensing element 356 may be polarized so as to be particularly sensitive to forces in the direction of airflow, cross-flow or the normal direction. Different sensing elements 356 may be polarized differently. The pressure applied in a direction normal to layer 358 will cause the gap between layers 360 and 374 to change thus changing the capacitance value between layers 360 and 374. A capacitance value measuring circuit (not shown) is preferably connected to layers 360 and 374 of diaphragm mount airflow sensor 375 to determine the actual capacitance value and/or change in capacitance from which the static pressure over the sensor is calculated. Accordingly, the pressure applied to sensor 350 in a normal direction is quantitively determined. Alternatively, a diaphragm sensor may be formed by layers 358, 374 and the air space therebetween. In such a sensor, there would be no PVDF material nor layer 360 separating layers 358 and 374.

An important noise source to be addressed is the response of the sensor to structural vibration. Aircraft structures are of primary concern, but windtunnels also have vibration noise that may show up when using high gain amplifiers. A modal survey may be employed to identify structural noise sources, but this is difficult to do in the dynamic flight environment. The present invention utilizes common mode rejection circuit to eliminate large components of structural noise. Such circuits are well known and require no further description. PVDF sensors such as those depicted in FIGS. 2 and 3 are preferably rigidly adhered to the surface of the structure directly underneath flow sensors such as those depicted in FIGS. 14 and 15. Because the sensors are isolated from the fluid flow, they respond primarily to the vibration or strain of the structure. The flow sensor primarily sees the response of the airflow, but also detects the vibration or strain of the structure upon which it is mounted as well. By properly electrically tuning these sensor pairs, structural noise may be effectively filtered or removed from the flow sensor by use of the common mode rejection circuit.

Figure 16:
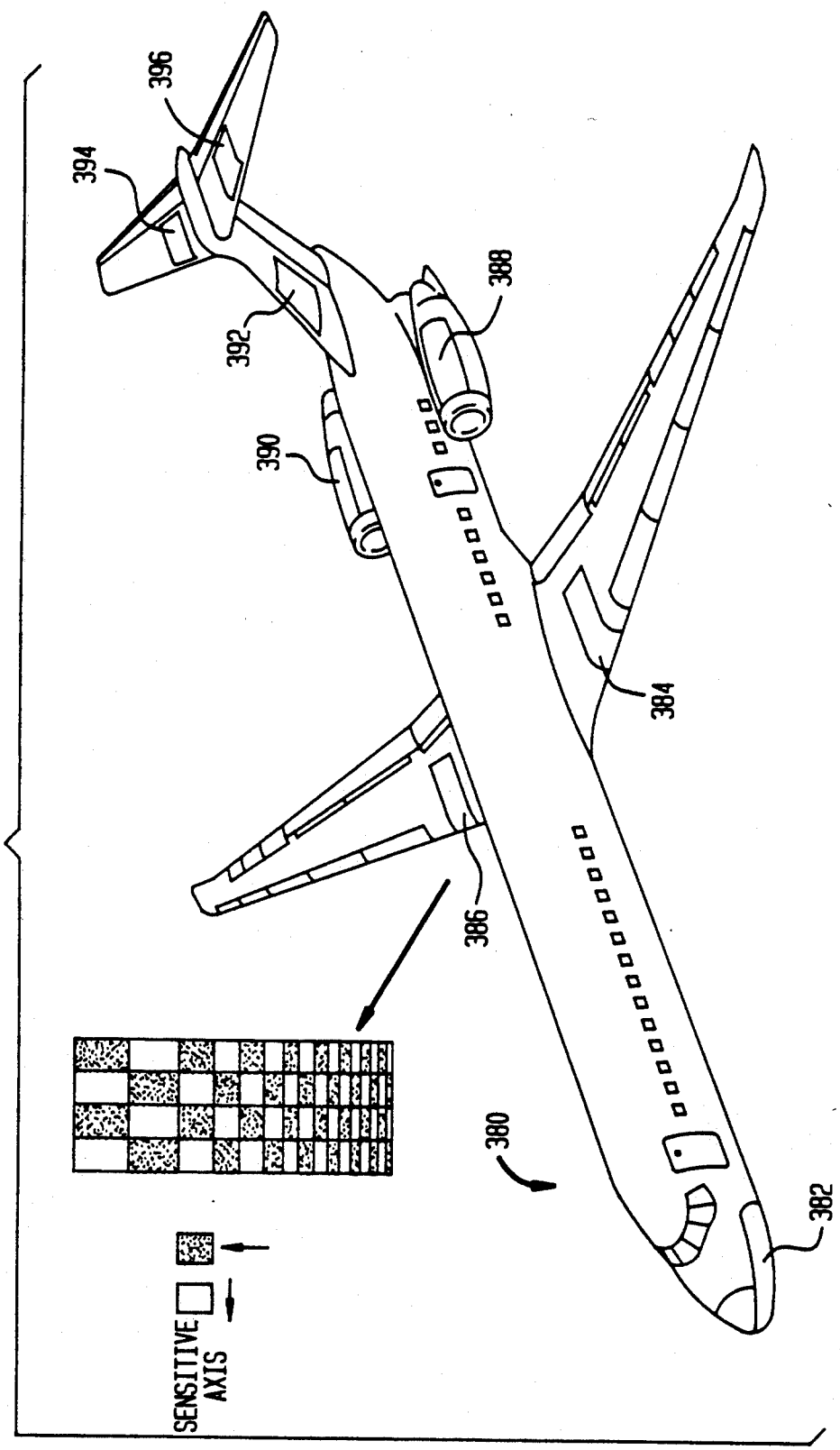
FIG. 16 depicts illustrative sensor array configurations mounted on a typical aircraft.

FIG. 16 depicts a typical aircraft incorporating certain aspects of the present invention, including 2-dimensional PSAs installed on certain aircraft surfaces. In particular, an aircraft 380 is provided with fuselage sensors 382, leading edge and top wing sensors 384, 386, engine inlet sensors 388, 390, tail sensors 392 and horizontal stabilizer sensors 394, 396. Specifically, aircraft 380 is also preferably equipped with sensors such as those depicted in FIGS. 14, 15. As will be appreciated by one skilled in the art, these sensors detect and monitor boundary layer transition flow, leading edge and top wing ice accretion and/or vortices. Each of these sensors may be formed on a single PVDF film having at most two metallization layers which are etched to form the individual sensors.

Figure 17:
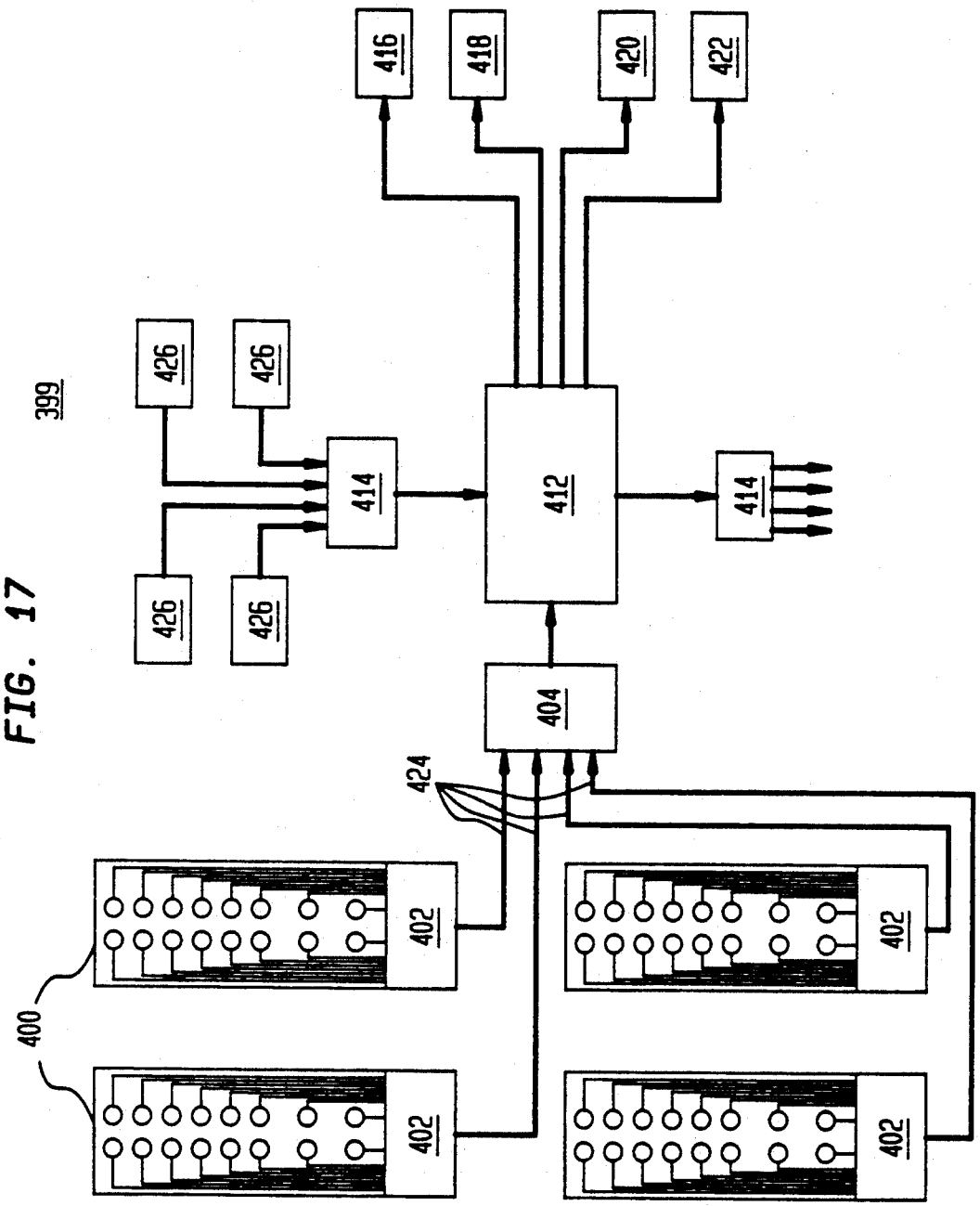
FIG. 17 depicts suitable apparatus for processing signals output by any of the sensors or sensor arrays of the present invention.

FIG. 17 depicts suitable apparatus 399 for processing signals output by any of the sensors or sensor arrays of the present invention. Specifically, such apparatus includes transmitters 402, a receiver 404, a computer 412, an analog and digital interface 414, chart recorder 416, real-time CRT graphics display 418, hard disk data storage 420, data storage 422, coax cable 424, and additional sensors 426.

Transmitter 402 mounts directly to PSA 400. Transmitter 402 codes the signals output by PSA 400 modulating the signals output by the individual sensors of each of the sensor arrays of PSA 400. A single coax cable 424 provides power to each PSA 400, as well as signals back to the receiving equipment.

Preferably, the individual sensors of sensor array 400 are constructed and arranged so as to be particularly sensitive to forces in different directions so as to define the boundary layer profile. For example, some of the sensors detect normal forces, some detect forces in a flow direction and some detect forces in a cross-flow direction. Capacitance type PVDF sensors as shown in FIG. 8 may be included in the PSA to provide a direct measurement of localized ice thickness.

Computer 412 includes signal processing software to digitally process the data from receiver 404 and display the data for diagnositic and monitoring purposes. The data is preferably displayed in real-time or near real-time or in an averaging mode on a high resolution graphics display CRT 418. By collecting and analyzing data from PSA 400, and from additional sensors 426 such as altitude sensor and airspeed sensors, the boundary layer profile may be determined and a display may be produced depicting two-dimensional chordwise/spanwise pressure and shear distributions. The sensor data may be stored on chart recorder 416, hard disk data storage 420, and/or data storage 422, illustratively a nine track device.

As will be appreciated, the signal(s) output by sensor array 400 may be processed to yield numerous displays as well as alarms or warnings indicating certain conditions. Alarms may be output indicating the existence of potential stall conditions and ice thickness. Vortices as well as the nature of airflow, i.e., laminar, transitional or turbulent, are also monitored and displayed. Additional displays useful to a pilot include amount of reserve lift, sensor RMS voltage level verses percent chord length, Fast Fourier Transform (FFT) spectrums and the like.

Figure 18:
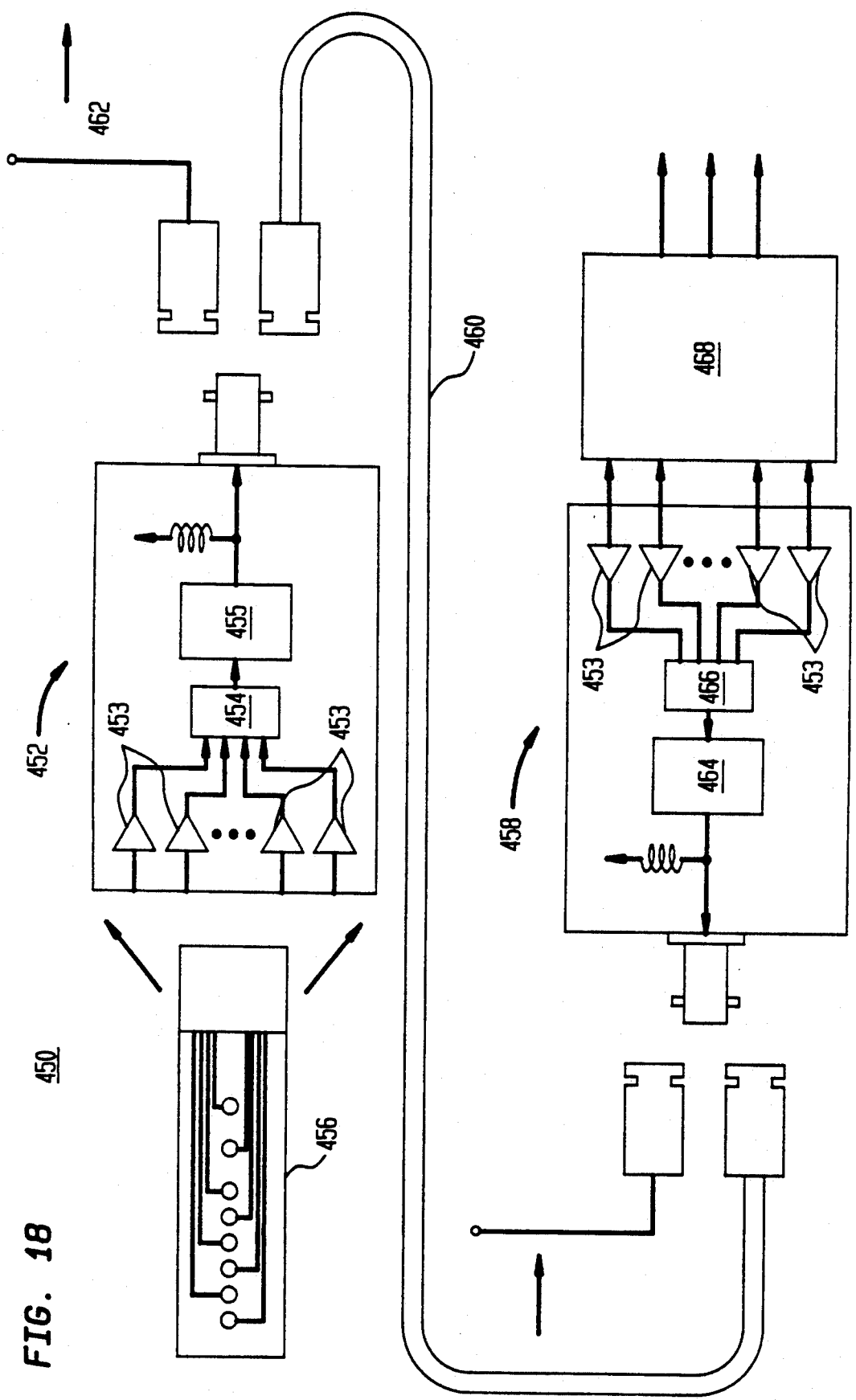
FIG. 18 depicts a transmitter/receiver apparatus for processing sensor signals.

FIG. 18 depicts a modular transmitter/receiver 450 for communication with a PSA 456 and a receiver 458. PSA 456 is similar in structure and function to other PSAs described herein. Preferably, sensor signal conditioning is performed as close to the sensors as possible. This design has several advantages including reduction of wiring complexity, reduced pickup of electrical noise, improved sensor frequency response through reduction of wiring capacitance, and minimization of signal degradation from long cable runs.

Transmitter 452 comprises amplifier/filters 453, multiplexer 454, and a modulator 455. Transmitter 452 preferably accepts a plurality of inputs from PVDF sensors, as well as inputs from other types of sensors such as temperature and pressure transducers which may be mounted within the PSA 456. Transmitter gains and filters are selectable depending on a given application.

A preferred embodiment of the transmitter employs a small printed circuit board assembly using surface mount components. In order to meet environmental conditions, the transmitter is encapsulated with an epoxy conformal coating.

Transmitter 452 routes sensor signals to receiver 458 through a single coax cable 460. Alternatively, a wireless link such as an ultra high frequency (UHF) FM telemetry link 462 may be employed and would eliminate the need for coax cable 460. Preferably, transmitter 452 is mounted directly to PSA 456, downstream of the last sensor element, and requires no hand wiring to connect the module to the array. Receiver 458 acts as an interface to a computer 468 and consists of a signal demodulator 464, demultiplexor 466, and amplifier/filters 453.

Figure 19:
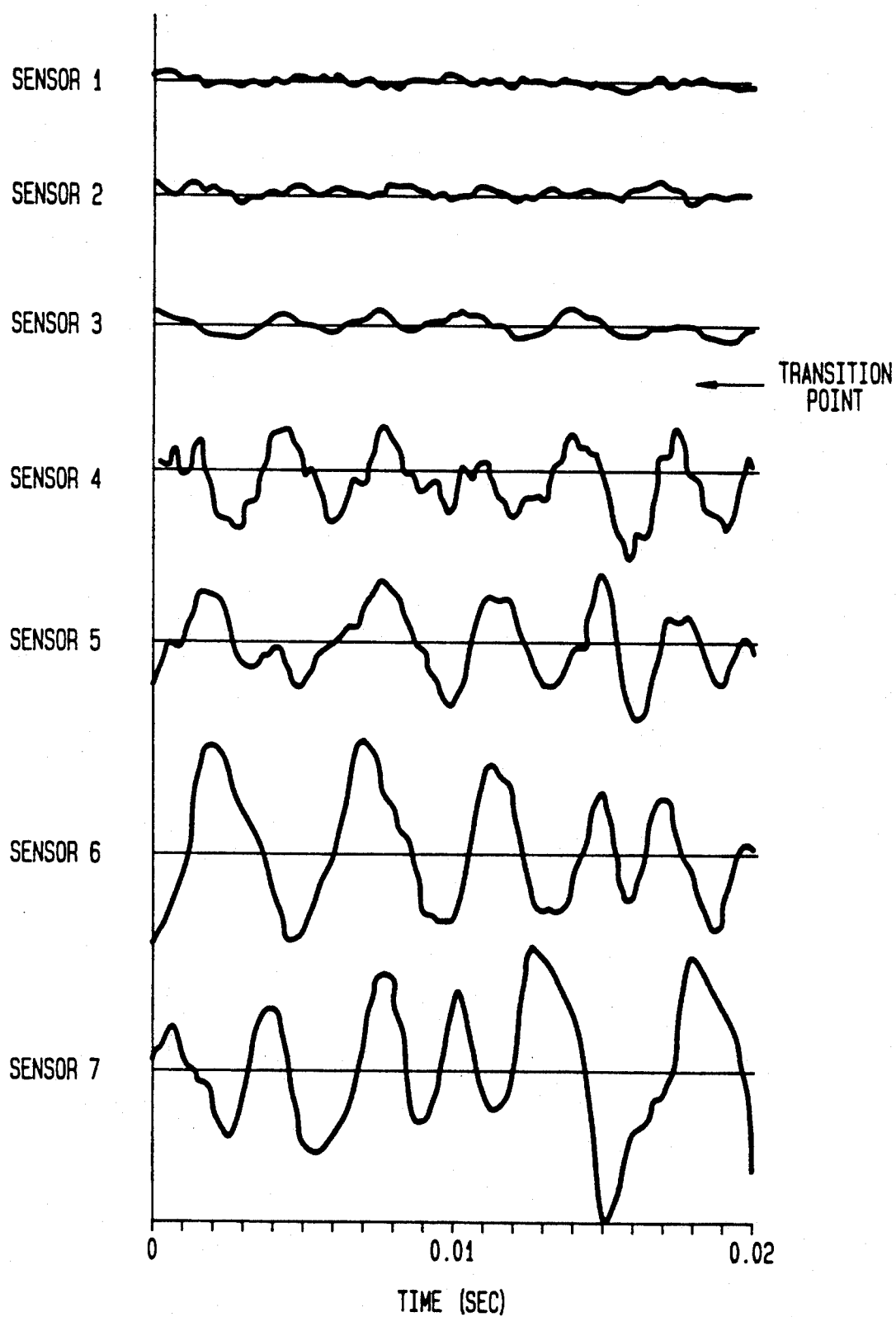
FIG. 19 depicts a time trace of the voltage level output by a sensor such as that depicted in FIG. 14 for seven sensors placed in line with each other on an aircraft wing.

FIG. 19 depicts a time trace of the voltage level output by a sensor such as that depicted in FIG. 14 for seven sensors placed in line with each other on an aircraft wing in the direction of a 120 mph airflow, with sensor 1 being nearest the leading edge of the wing. It is observed from the time trace data that the boundary layer T-S waves produce an oscillatory response in the sensor outputs. The amplitude of the oscillations increases significantly over segments 3 and 4 indicating that these two segments are within the transition region. A method to define the transition region is the characteristic statistical buildup in amplitude with increasing distance from the leading edge.

Figure 20:
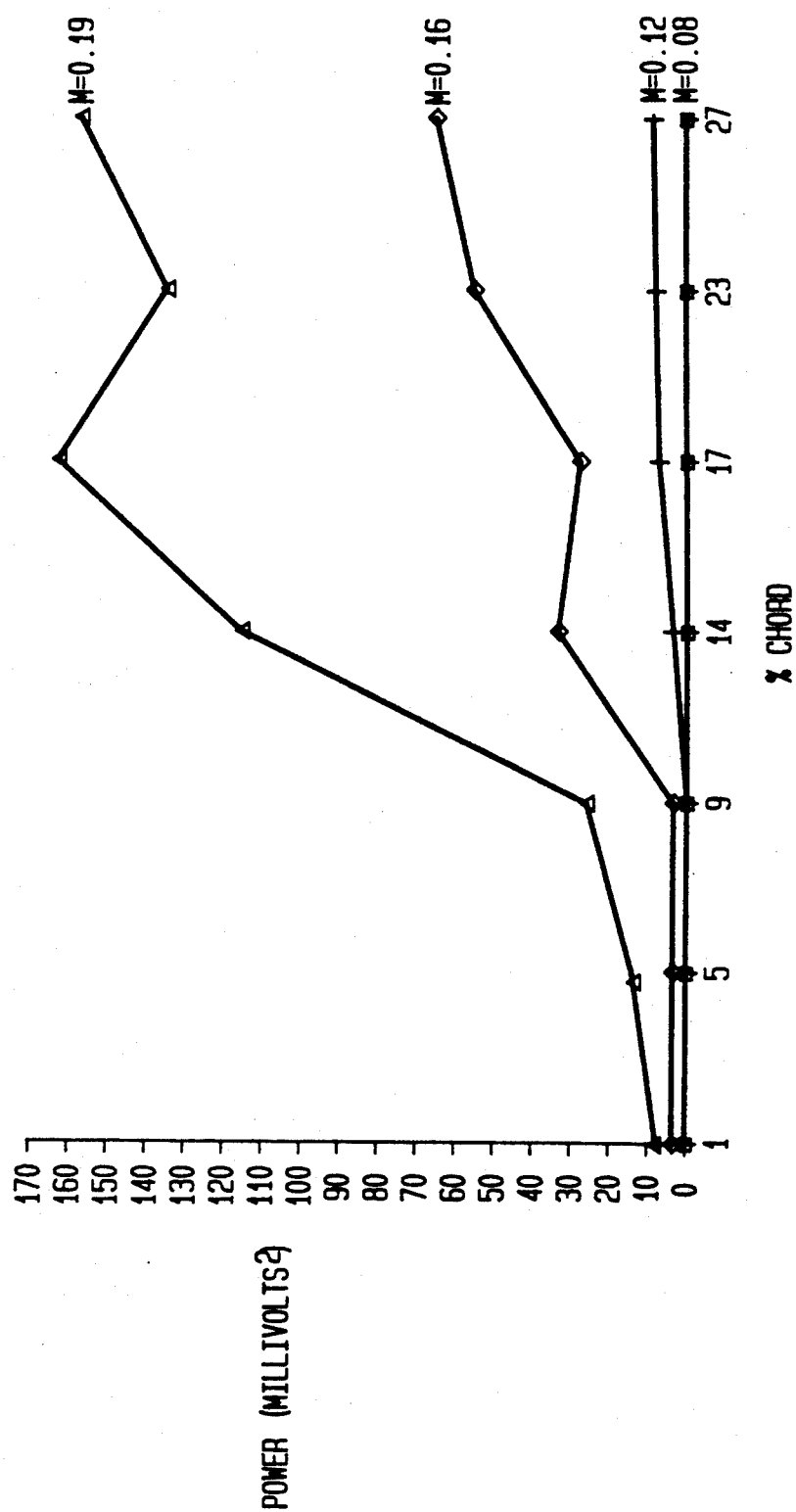
FIG. 20 depicts the RMS voltage level due to natural transition for each of seven sensors such as that depicted in FIG. 19.

FIG. 20 depicts the RMS voltage level due to natural transition for sensors arranged similarly to that of FIG. 19. The sensors are placed 1,5,9,14,17,23, and 27 percent of wing, or chord length. Four traces are shown for speeds of 0.08, 0.12, 0.16 and 0.19 Mach.

Figure 21:
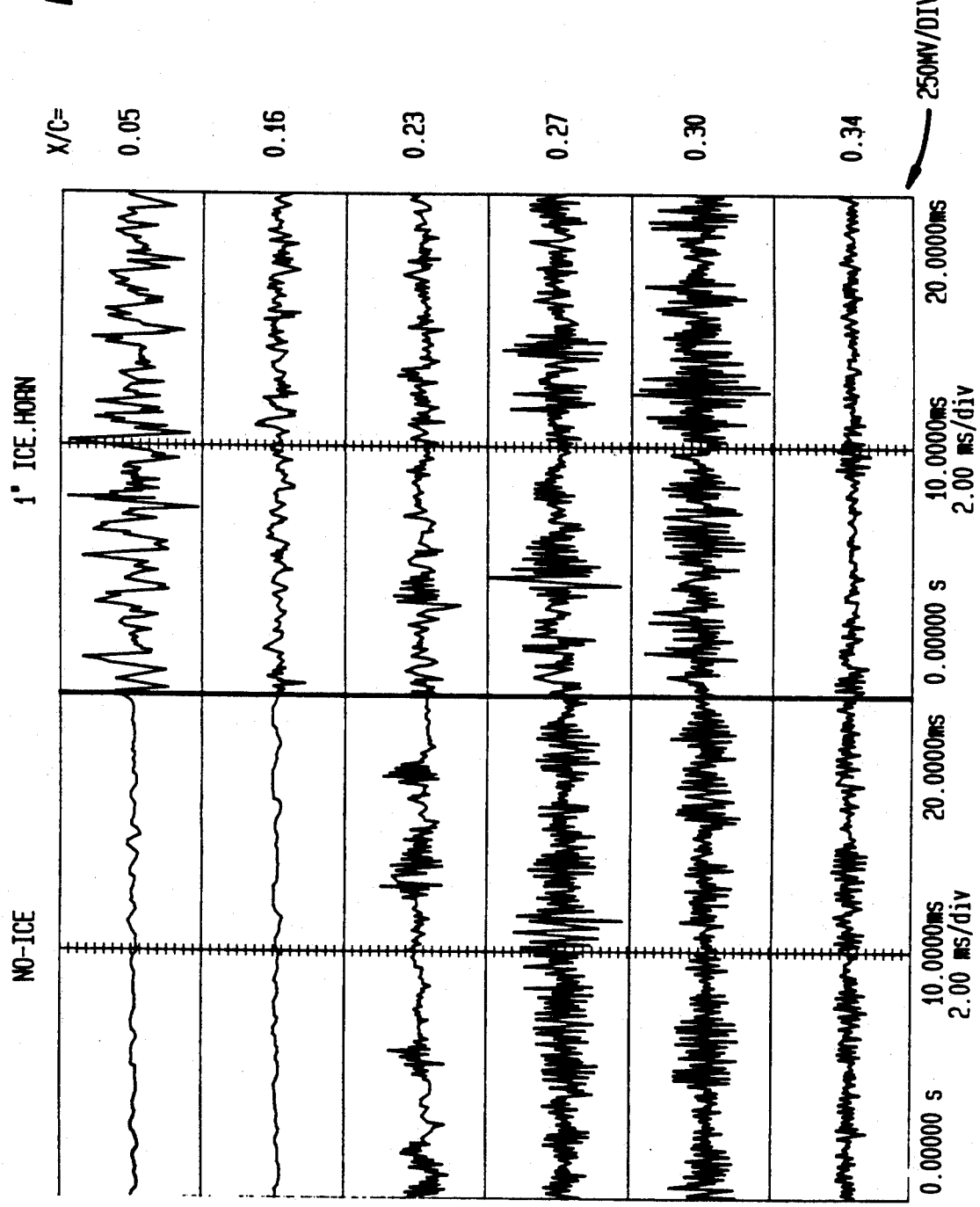
FIG. 21 depicts a time trace of the voltage level output by a sensor such as that depicted in FIG. 15 for six sensors placed in line with each other on an aircraft wing for no ice and for leading edge ice accretion one inch thick.

FIG. 21 depicts a time trace of the voltage level output by sensors such as that of FIG. 15 arranged along a chord in the direction of airflow from 5 to 34 percent of the chord (x/c). The first series of traces depict the sensor output without the influence of ice accretion; while in the other series of traces, the sensor output is significantly increased due to leading edge ice accretion one inch thick. These traces were obtained with a speed of 0.12 Mach (M), an angle-of-attack (AOA) of 0°, a Reynolds number (Re) of $3.3 \times 10^6$ and a chord length (c) of 53".

Figure 22:
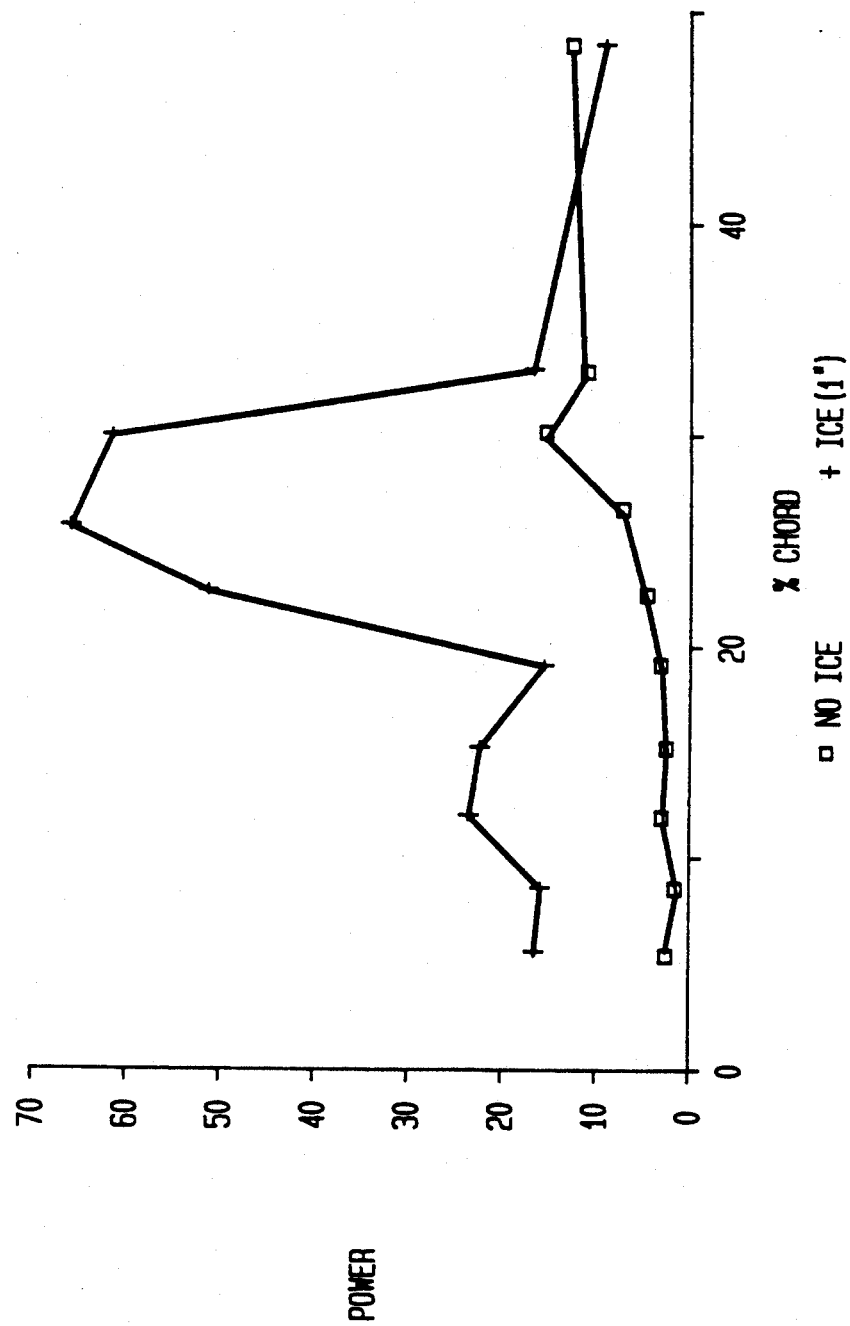
FIG. 22 depicts the RMS voltage level for each of ten sensors for no ice and for leading edge ice accretion one inch thick.

FIG. 22 depicts the power output by each of ten sensors positioned along a chord. In one trace, the sensor output power is depicted without the influence of ice accretion; while in the other trace, the sensor output power is significantly increased due to leading edge ice accretion one inch thick. These two traces were obtained with a speed of 0.18 Mach and an angle-of-attack of 0°.

Figure 23:
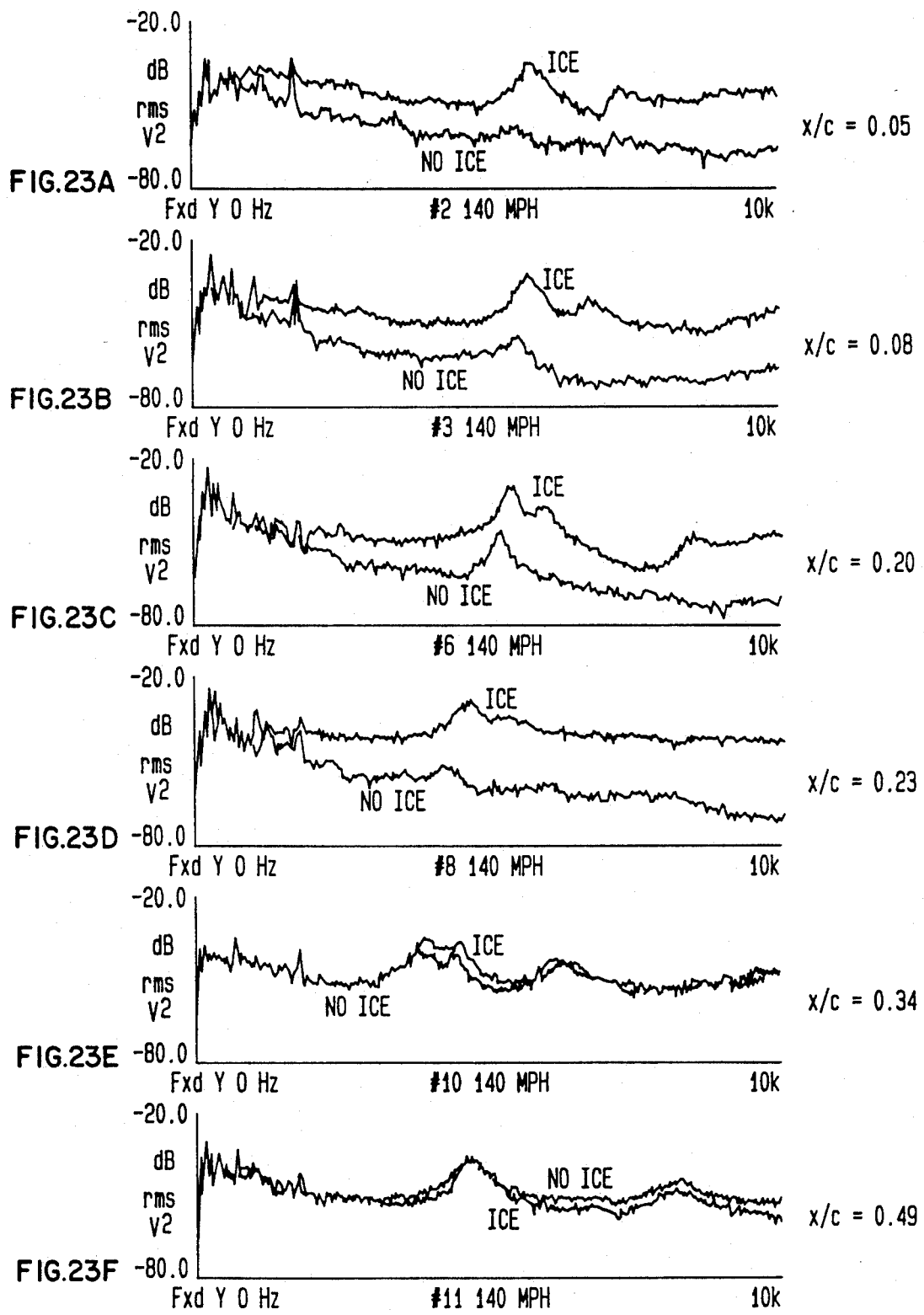
FIG. 23 depicts the power spectral density of each of six sensors for no ice and for leading edge ice accretion one inch thick.
Figure 24:
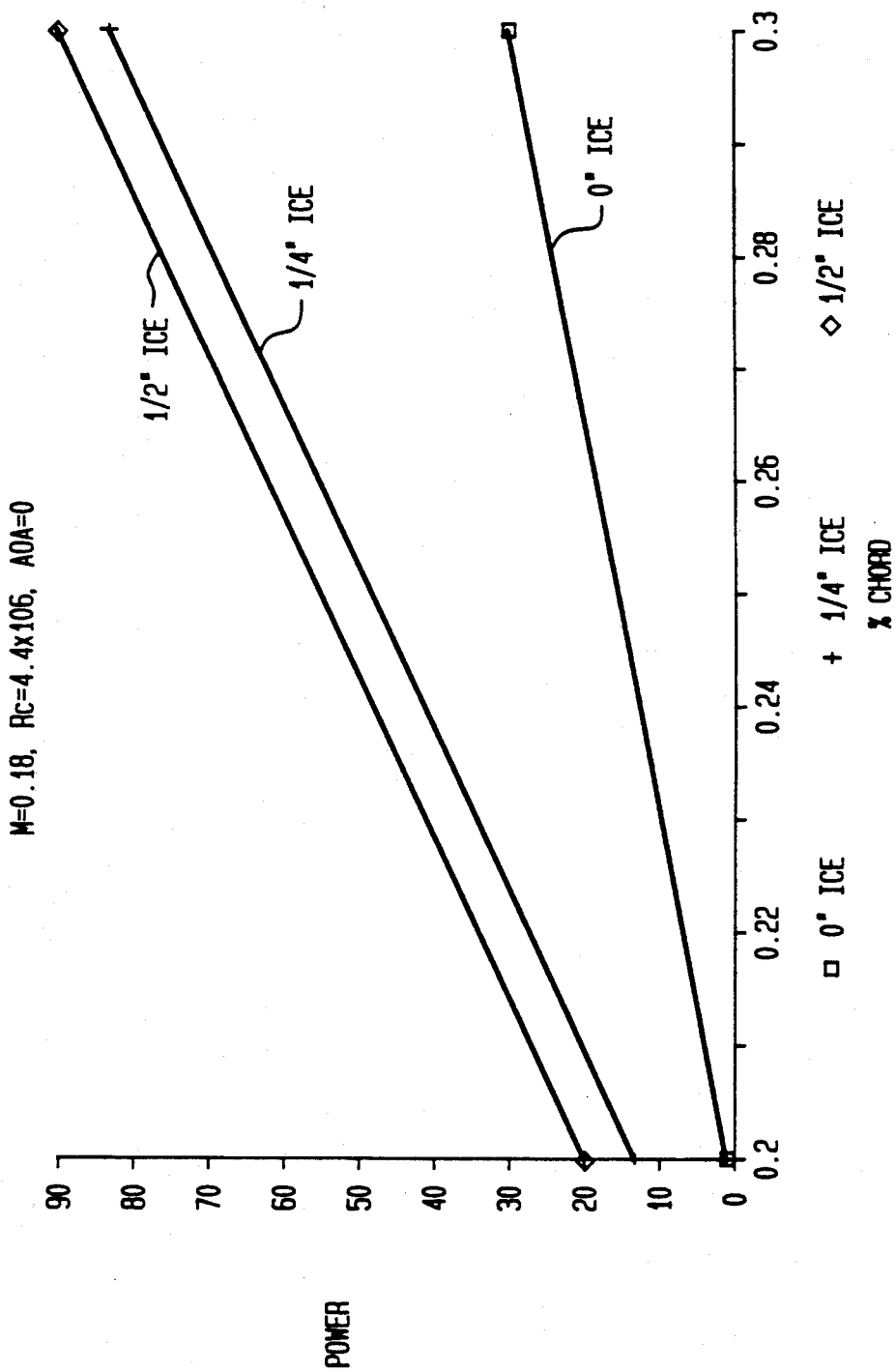
FIG. 24 depicts the RMS voltage level for a sensor such as that depicted in FIG. 23 for no ice and leading edge ice accretion one-fourth inch and one-half inch thick.

FIG. 23 depicts the corresponding power spectral densities of each of six sensors positioned along a chord. The frequency spectrum of the airflow increases directly aft the ice; and then farther downstream, the levels decrease to the no ice values. The increased power level correlates well to ice thickness as FIG. 24 depicts for 0", ¼", and ½" ice thickness.

Data, such as that depicted in FIGS. 19-24, from the sensor arrays in accordance with the invention may be analyzed using total RMS voltage level techniques to determine the local pressure fluctuations above the sensor element or power spectral density analysis to determine the frequency distribution of the energy. The RMS properties and power spectral densities of the sensor signals may be determined employing a dynamic signal analyzer based on the relationship:

$$v^2 = \int_{-\infty}^{\infty} \Phi(f) df \quad (4)$$

As in customary, the power spectral density $\Phi(f)$ is defined to also include negative frequencies such that $\Phi(f) = \Phi(-f)$. Thus $$v^2 = 2 \int_{0}^{\infty} \Phi(f) df \quad (5)$$

where the integration is performed over positive values of f in agreement with physical reality.

As will be appreciated, voltage versus time traces for no ice accretion may be employed to indicate the natural transition process where the boundary layer is first laminar and then transitional. Areas of local turbulence may be determined. When leading edge ice is present, the magnitude of the perturbations are much higher directly aft the ice. The unsteadiness of the flow caused by the ice shape may also be determined. As can be seen from comparisons of the RMS voltage levels for natural transition and for leading edge ice, the waveform has an elevated RMS voltage downstream of the ice. The ice accretion influences the flowfield far downstream of the ice. Generally, an increase in ice thickness results in an attendant increase in RMS voltage level measured by a sensor downstream of the ice. Additionally, the frequency spectrum of the airflow generally increases directly aft the ice as much as 20 dB at relatively high frequencies. Farther downstream, the levels generally decrease to the no ice values. These characteristics facilitate ice detection by sensors downstream of the ice formation.

Figure 25:
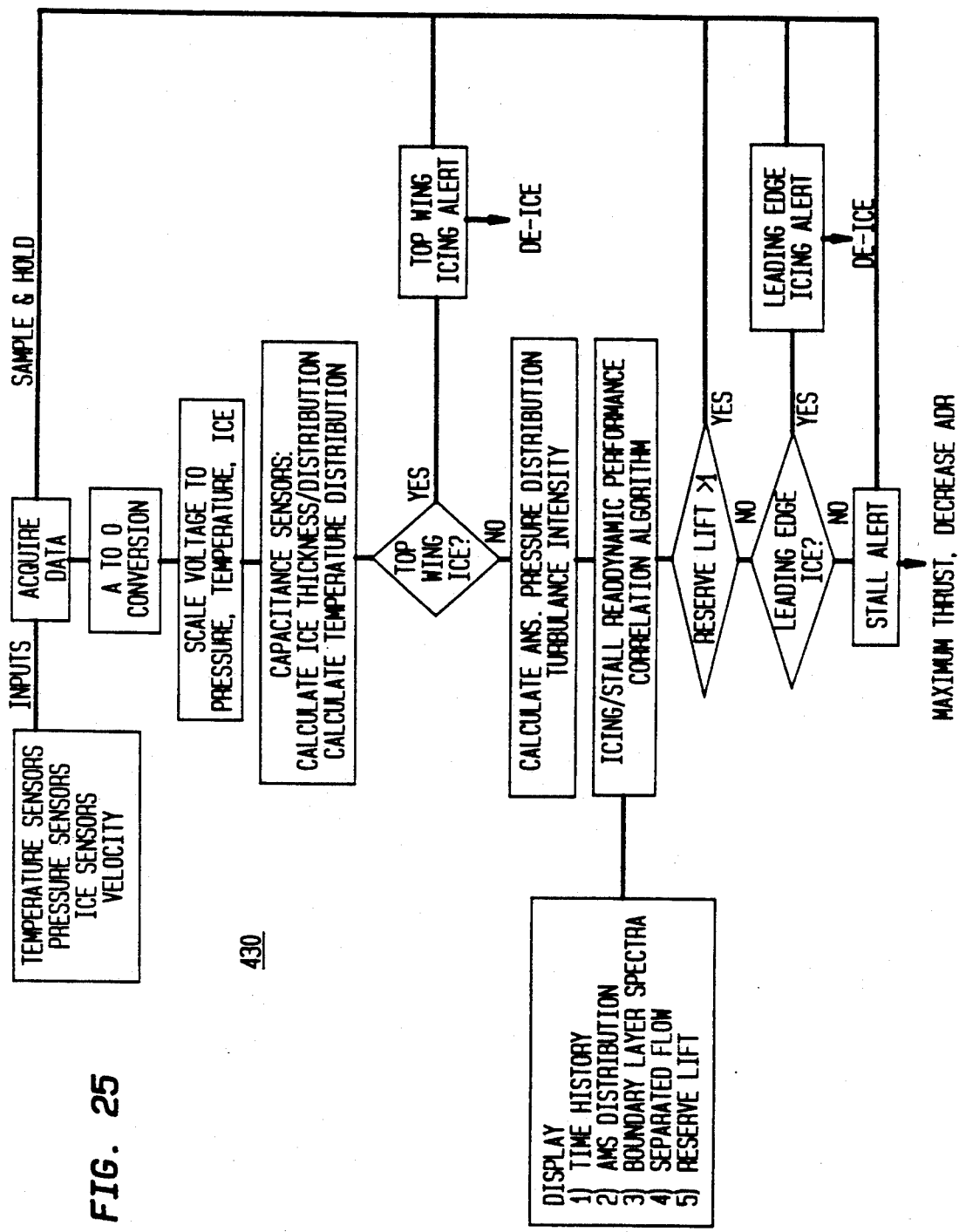
FIG. 25 depicts a signal processing software flow chart useful to monitor icing and stall conditions.

FIG. 25 depicts a signal processing software flow chart 430 useful to monitor icing and stall conditions. Temperature sensors, pressure sensors and ice sensors are employed as well as an aircraft velocity signal. Illustratively, a capacitance sensor such as that depicted in FIG. 8 which measures temperature and localized ice accretion and a pressure sensor such as that depicted in FIGS. 14 or 15 which measures non-localized ice and stall conditions are employed. Displays provided include a time history of sensor signals, RMS power distribution of sensor signals, boundary layer spectra, flow separation or transitional regions, and amount of reserve lift available. The pilot is warned of top wing icing and leading edge icing as well as an impending stall.

While it is apparent that the invention herein disclosed is well calculated to fulfill the objects stated as well as others, it will be appreciated that numerous modifications and embodiments may be devised by those skilled in the art, and it is intended that the appended claims cover all such modifications and embodiments as fall within the spirit and scope of the present invention.

We claim:

1. An apparatus for measuring localized ice thickness comprising:
an ice presence sensor having a first metallization layer facing towards an environment, a second metallization layer, and a dielectric layer between said first and second metallization layers, said second metallization layer being greater in surface area than said first metallization layer, wherein existence of ice in an area surrounding said first metallization layer causes a capacitance value associated with said ice presence sensor to change; and
an ice thickness sensor having a dielectric layer, and having first and second metallization layers located on one side of said dielectric layer and facing towards the environment, wherein existence of ice in an area between said first and second layers of said ice thickness sensor causes a capacitance value associated with said ice thickness sensor to change.

2. The sensor of claim 1 further comprising a temperature sensor having a first metallization layer facing towards the environment, a second metallization layer, and a dielectric layer between said first and second metallization layers of said temperature sensor, wherein said dielectric layer has a dielectric constant which varies in a known manner with temperature.

3. The sensor of claim 1 further comprising capacitance measuring means for measuring a capacitance value of said ice presence sensor in which said first and second metallization layers of said ice presence sensor function as electrodes, and for measuring a capacitance value of said ice thickness sensor in which said first and second metallization layers of said ice thickness sensor function as electrodes.

4. The sensor of claim 1 wherein said dielectric layer of said ice presence sensor and said dielectric layer of said ice thickness sensor comprise corresponding portions of a single dielectric layer.

5. The sensor of claim 4 wherein said single dielectric layer is constructed from polyvinylidene fluoride.

6. The sensor of claim 1 wherein said ice presence sensor has a capacitance value without ice or water present which is greater than a capacitance value of said ice thickness sensor without ice or water present.

7. The sensor of claim 1 wherein said dielectric layer of said ice presence sensor and said dielectric layer of said ice thickness sensor are constructed from piezoelectric material.

8. An apparatus for detecting non-localized icing on a surface, comprising:
   transducer means for transducing aerodynamic forces applied over the surface and to said transducer means into electrical signals, said transducer means being attached to said surface, and said aerodynamic forces varying in accordance with formation of ice on said surface and upstream from said transducer means; and
   signal processing means for processing said electrical signals to detect a change in said electrical signals upon the formation of ice on said surface and upstream from said transducer means.

9. An apparatus for detecting non-localized icing on an aircraft wing comprising;
   a plurality of transducer means for transducing forces applied to said transducer means into electrical signals, said transducer means being attachable to and placed on said aircraft wing at various chord lengths downstream from a leading edge of said wing; and
   signal processing means for processing said electrical signals so as to detect a change in said electrical signals upon the formation of ice upstream from said transducer means, and said signal processing means for processing said electrical signals to determine the boundary layer flow characteristics and then correlating the boundary layer flow characteristics to ice thickness.

10. The apparatus of claim 9 wherein said signal processing means detects ice formation upstream from at least one of said transducer means by detecting boundary layer separation.

11. The apparatus of claim 9 further comprising a boot in which said plurality of transducer means are located and which is retrofittable onto said wing.

12. The apparatus of claim 9 wherein said plurality of transducer means are embedded within said wing.

13. The apparatus of claim 9 wherein said plurality of transducer means comprises a piezoelectric sensor having a first metallization layer, a second metallization, and a piezoelectric layer therebetween.

14. A sensor for determining ice thickness on a surface comprising:
   first and second electrodes arranged on the surface such that the capacitance between said first and second electrodes is indicative of the presence of ice on said surface;
   third and fourth electrodes arranged on the surface such that the capacitance between said third and fourth electrodes varies in accordance with the amount of ice on said surface; and
   fifth and sixth electrodes arranged on the surface such that the capacitance between said fifth and sixth electrodes varies in accordance with the temperature of said surface.

* * * * *

UNITED STATES PATENT AND TRADEMARK OFFICE
CERTIFICATE OF CORRECTION

PATENT NO.   : 5,191,791
DATED        : March 9, 1993
INVENTOR(S)  : Joseph J. Gerardi, Gail A. Hickman It is certified that error appears in the above-indentified patent and that said Letters Patent is hereby corrected as shown below:

On the title page: Item [75]

Should read -- Joseph J. Gerardi, 81 Crystal Dr., Dryden, N.Y. 13053; Gail A. Hickman, 81 Crystal Dr., Dryden, N.Y. 13053

Signed and Sealed this

Twenty-eighth Day of December, 1993

*Attest:*

BRUCE LEHMAN

*Attesting Officer*     Commissioner of Patents and Trademarks